(12) United States Patent
Tani et al.

(10) Patent No.: US 7,234,784 B2
(45) Date of Patent: Jun. 26, 2007

(54) BRAKE DEVICE FOR A TWO-WHEELED MOTOR VEHICLE, AND METHOD OF USING SAME

(75) Inventors: Kazuhiko Tani, Saitama (JP); Masanobu Nakayama, Saitama (JP); Yukimasa Nishimoto, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 57 days.

(21) Appl. No.: 10/905,776

(22) Filed: Jan. 20, 2005

(65) Prior Publication Data

US 2005/0168063 A1 Aug. 4, 2005

(30) Foreign Application Priority Data

Jan. 30, 2004 (JP) ............................. 2004-024042

(51) Int. Cl.
*B60T 13/00* (2006.01)
(52) U.S. Cl. .................................. 303/9.64; 303/113.5
(58) Field of Classification Search ................ 303/9.64
See application file for complete search history.

(56) References Cited

U.S. PATENT DOCUMENTS

| 4,440,452 A | * | 4/1984 | Burckhardt ................ 303/9.64 |
| 4,465,322 A | * | 8/1984 | Hayashi ..................... 303/9.64 |
| 4,626,038 A | * | 12/1986 | Hayashi et al. ........... 303/9.64 |
| 4,834,221 A | * | 5/1989 | Yoshinori et al. ....... 188/181 A |
| 4,989,922 A | * | 2/1991 | Pickenhahn et al. ........ 303/137 |
| 5,257,856 A | * | 11/1993 | Ota et al. .................... 303/198 |
| 5,273,346 A | * | 12/1993 | Tsuchida et al. ............... 303/2 |
| 5,297,859 A | * | 3/1994 | Suzuki et al. ................ 303/137 |
| 5,324,102 A | * | 6/1994 | Roll et al. ................... 303/137 |
| 5,372,408 A | * | 12/1994 | Tsuchida et al. ........... 303/9.64 |
| 5,386,366 A | * | 1/1995 | Roll et al. ..................... 701/70 |
| 5,577,816 A | * | 11/1996 | Suzuki et al. ............... 303/174 |
| 6,062,660 A | * | 5/2000 | Matsuno et al. ............ 303/173 |

FOREIGN PATENT DOCUMENTS

JP 2002029403 A 1/2002

* cited by examiner

*Primary Examiner*—Robert A. Siconolfi
(74) *Attorney, Agent, or Firm*—Carrier, Blackman & Associates, P.C.; William D. Blackman; Joseph P. Carrier

(57) ABSTRACT

In a braking device of a motorcycle, in which a rear wheel braking mechanism is operated in conjunction with a front wheel braking operation, accurate determination of a reduction in rear wheel load is provided, and additional reduction of the rear-wheel load is prevented. Determination of a reduction in rear-wheel load is based on vehicle speed in the front wheel braking operation, hydraulic pressure of a brake caliper on the front wheel side, and respective slip ratios of the front and rear wheels. When the rear-wheel load is reducing, hydraulic pressure of a brake caliper on the rear wheel side is controlled so as to keep the slip ratio of the rear wheel at or below a set value. A hydraulic modulator supplies/evacuates the hydraulic pressure to/from the brake caliper on the rear wheel side, and the slip ratio of the rear wheel is controlled by electrically controlling the hydraulic modulator.

13 Claims, 15 Drawing Sheets

Fig. 13a
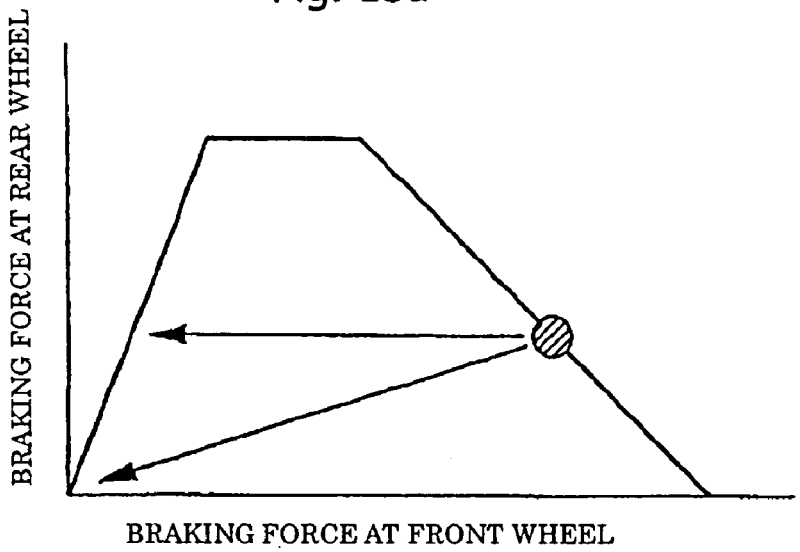
BRAKING FORCE AT FRONT WHEEL
Fig. 13b
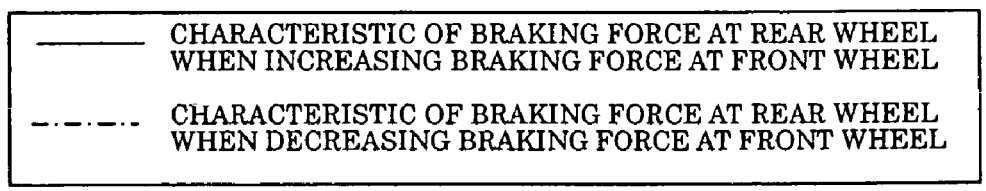
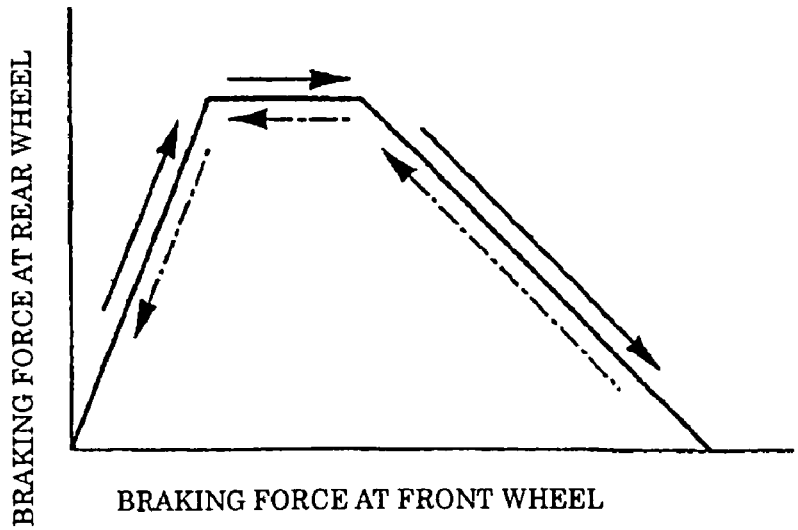
BRAKING FORCE AT FRONT WHEEL
PRIOR ART

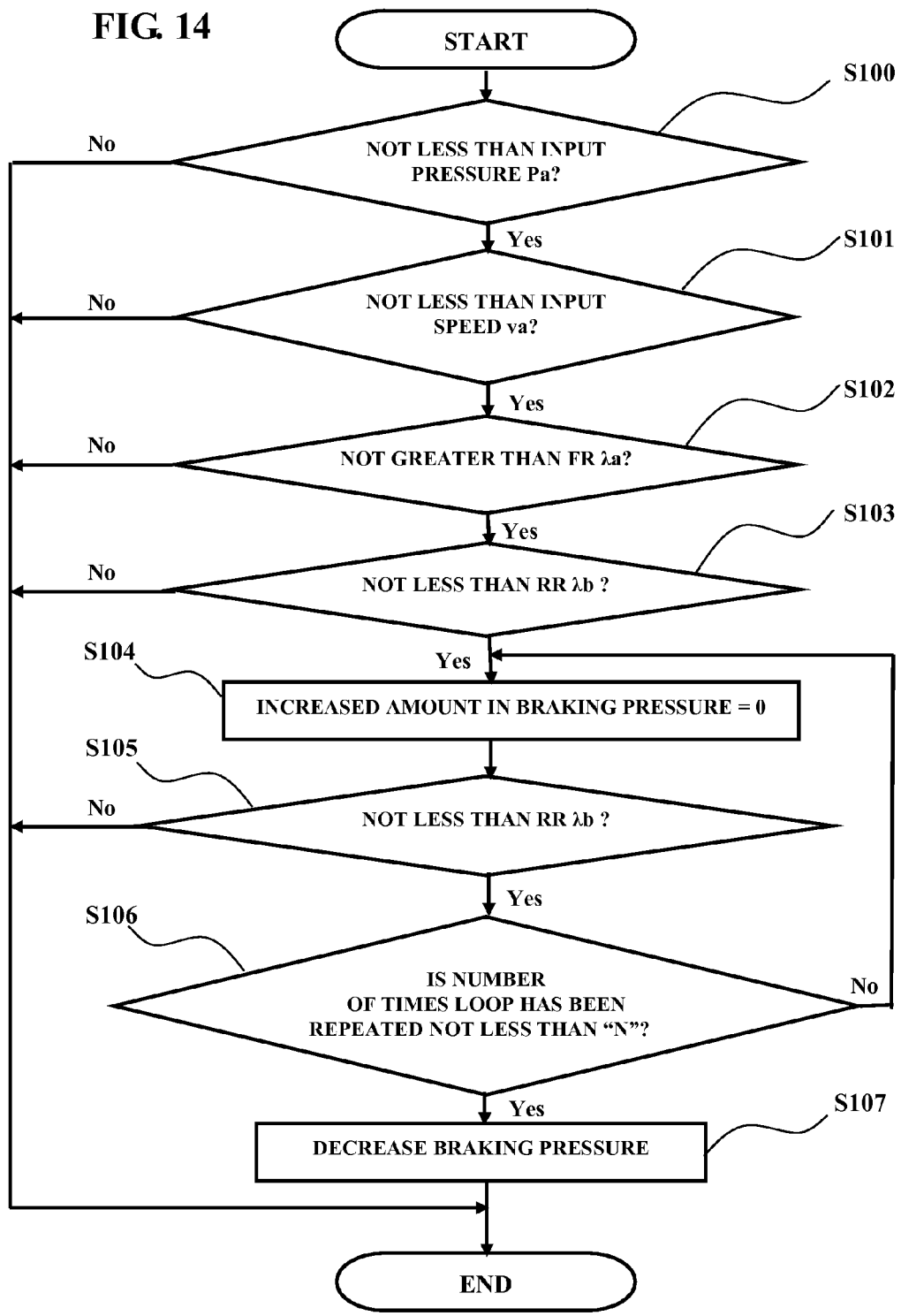

PRIOR ART

BRAKE DEVICE FOR A TWO-WHEELED MOTOR VEHICLE, AND METHOD OF USING SAME

CROSS-REFERENCE TO RELATED APPLICATIONS

The present invention claims priority under 35 USC 119 based on Japanese patent application No. 2004-024042, filed on Jan. 30, 2004. The subject matter of the priority document is incorporated by reference herein.

BACKGROUND OF THE INVENTION

The present invention relates to a braking device for a two wheeled motor vehicle such as a motorcycle. More particularly, the present invention relates to a braking device for a motorcycle which can coordinate operation of a rear wheel braking mechanism with operation of a front wheel braking mechanism.

A braking device for a motorcycle, that is capable of detecting reduced rear-wheel load resulting from braking of the front wheel, and thereby preventing trouble with brake control due to the reduction of the rear-wheel load, is known. One example of such a device is disclosed in Japanese Laid-Open Patent No. 2002-29403.

The braking device described in Japanese Laid-Open Patent No. 2002-29403 monitors changes in a rear wheel speed, and detects a reduction of the rear-wheel load associated with front wheel braking, based on the changes in the wheel speed. For example, as shown in FIG. 15 of the present drawings, the conventional braking device determines that the rear-wheel load is reduced when the rear wheel speed changes so as to have small deceleration gradient in relation to the front wheel braking (see the line denoted as "conventional rear wheel speed" in FIG. 15).

However, in the braking device described in Japanese Laid-Open Patent No. 2002-29403, a brake system in which wheel braking mechanism on the front and rear wheels are not operated in conjunction with each other is a prerequisite. Thus, the reduction of the rear-wheel load during a front wheel braking operation cannot be accurately detected in a device adopting a brake system in which the front and rear wheel braking devices are operated in conjunction with each other by a braking operation of one of the front and rear wheels (CBS: COMBINED BRAKE SYSTEM, hereinafter referred to as a "CBS"), even if the foregoing conventional technology is applied thereto as is.

Specifically, in the case of the known system in which the front and rear wheel braking devices are not operated in conjunction with each other, when the rear-wheel load is reduced as a result of front wheel braking, the deceleration gradient of the rear wheel acted upon by no braking force changes to become smaller. However, in the case of the CBS, when the rear-wheel load is reduced during the front wheel side braking operation, the braking force effectively acts on the rear wheel to increase the deceleration gradient, contrary to the above case (see the line denoted as "CBS rear wheel speed" in FIG. 15). The change of the deceleration gradient increasing in the middle, as described above, is a change similar to an ordinary slip in braking. Thus, the reduction of the rear-wheel load during the front wheel side braking operation cannot be accurately detected, using the known devices.

SUMMARY OF THE INVENTION

In braking devices employing CBS, a technology is currently being studied for determining, in an early stage, if the rear-wheel load reduces during the front wheel side braking operation, and for preventing additional reduction of the rear-wheel load by adjusting a hydraulic distribution to the rear wheel side. In addition, it has been desired to devise a technology capable of accurately determining reduction of the rear-wheel load.

It is an object of the present invention to provide a braking device for a motorcycle which employs CBS, which can accurately determine if the rear-wheel load is reduced during the front wheel side braking operation, and which can prevent further reduction of the rear-wheel load based on the determination.

In order to achieve the foregoing object, a first illustrative embodiment of the present invention includes a braking device for a motorcycle, in which a rear wheel braking mechanism is operated in conjunction with a front wheel side braking operation, characterized by determining if rear-wheel load is reduced, based on a) a vehicle speed in the front wheel side braking operation, and b) a hydraulic pressure applied to the front wheel braking mechanism. When a reduction of the rear-wheel load is determined, the braking device controls the rear wheel braking mechanism to suppress the reduction of the rear-wheel load.

A vehicle speed at which the reduction of the rear-wheel load is started during front wheel braking, and front wheel braking force, are determined to be approximately specific, based on a wheel base of the vehicle and a position of gravitational center thereof. Thus, in the practice of the first embodiment of the present invention, the reduction of the rear-wheel load is determined based on the vehicle speed in the front wheel side braking operation, and the hydraulic pressure applied to the front wheel braking mechanism. Since this determination method does not use changes in the rear wheel speed, the reduction of the rear-wheel load can be determined without any problems, even if the braking force acts on the rear wheel.

Moreover, a second embodiment of the present invention provides a braking device for a motorcycle which has the same prerequisite configuration as described above, characterized by determining if the rear-wheel load is reduced based on a) vehicle speed in a front wheel side braking operation, b) hydraulic pressure of front wheel braking mechanism, and c) respective slip ratios of the front and rear wheels. When a reduction in the rear-wheel load is determined, the hydraulic pressure applied to rear wheel braking mechanism is controlled so as to keep the slip ratio of the rear wheel at or below a set value.

Accordingly, it is possible to avoid, based on a determination of reduced rear-wheel load, a case where the front and rear wheels similarly slip under a condition that the wheel speed and the hydraulic pressure on the front wheel side are equal to or more than set values. Moreover, when it is determined that the rear-wheel load is reduced, the hydraulic pressure applied to rear wheel braking mechanism is controlled while the slip ratio of the rear wheel is monitored. Thus, the reduction of the rear-wheel load is surely suppressed.

Furthermore, a third embodiment of the present invention includes the braking device for a motorcycle as described above, further characterized by a hydraulic pressure being produced by an electric actuator, and a hydraulic modulator which regulates a supply of hydraulic pressure to or from the rear wheel braking mechanism. When a reduced rear-wheel load is determined, the hydraulic modulator is electrically controlled so as to maintain or reduce the hydraulic pressure applied to the rear wheel braking mechanism.

In the case as described above, when it is determined that the rear-wheel load is reduced, braking force of the rear wheel braking mechanism is quickly and accurately controlled by electrically controlling the hydraulic modulator.

According to a first aspect of the invention, in the braking device which employs the CBS in which the braking force acts on the rear wheel in the front wheel braking operation, the reduction of the rear-wheel load can be approximately accurately determined. Thus, based on the determination, additional reduction of the rear-wheel load can be prevented.

According to a second aspect of the invention, it is possible to avoid a condition that the front and rear wheels similarly slip from the determination of the reduction of the rear-wheel load according to the invention described above. Thus, the reduction of the rear-wheel load can be determined with higher accuracy. Moreover, the hydraulic pressure applied to rear wheel braking mechanism is controlled while the slip ratio of the rear wheel is monitored. Thus, the reduction of the rear-wheel load can be effectively suppressed.

According to a third aspect of the invention, the rear wheel braking mechanism is controlled by electrically controlling the hydraulic modulator. Thus, the reduction of the rear-wheel load can be suppressed with high accuracy and high responsiveness.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

BRIEF DESCRIPTION OF THE DRAWINGS

FIG. 13(a) is a braking force distribution characteristic view for front and rear wheels when a braking operation is performed to a front wheel in the embodiment of FIG. 1.

FIG. 13(b) is a braking force distribution characteristic view for front and rear wheels when a braking operation is performed to a front wheel in a prior art braking system.

FIG. 14 is a flowchart showing the process for suppression of lowering of the rear wheel contact load as performed by the controller.

DETAILED DESCRIPTION

Next, a selected illustrative embodiment of the present invention will be described, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
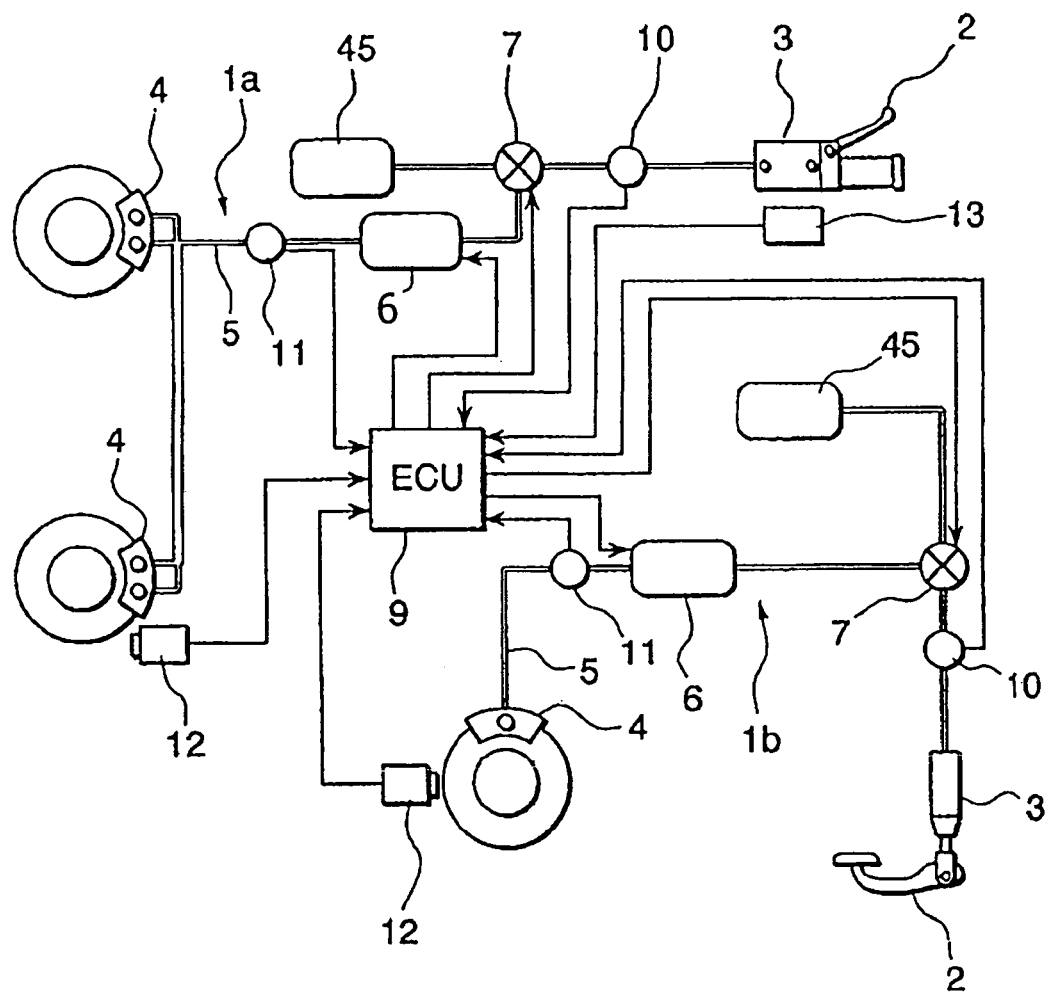
FIG. 1 is a simplified schematic view of a combined brake system showing an embodiment of the present invention.
Figure 2:
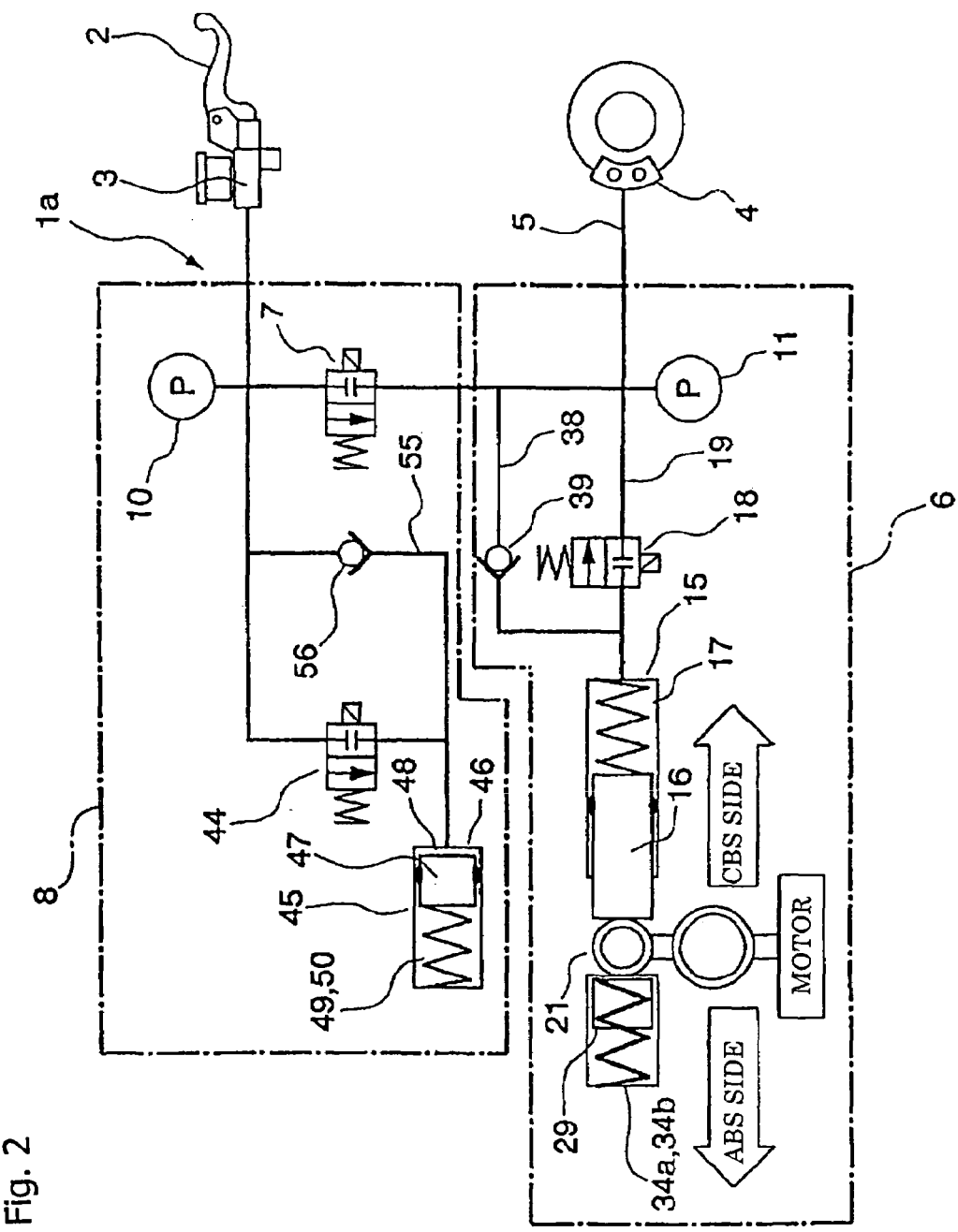
FIG. 2 is a schematic view of a braking circuit at a front wheel for the embodiment of FIG. 1.

FIG. 1 is an overall schematic view of a braking device according to a selected illustrative embodiment of the present invention. As shown in FIG. 1, the braking device of this embodiment includes a front wheel brake circuit 1a at a front wheel, and a rear wheel brake circuit 1b at a rear wheel, each of the circuits being independent of each other. In the respective front and rear brake circuits 1a, 1b of this embodiment, although there are some differences between the two circuits, all the other basic constituents are substantially the same. For example, brake circuits 1a and 1b differ from each other in that a brake actuator 2 at the front wheel is a lever, while that at the rear wheel is a pedal. A specific description of the circuit arrangement will be described in detail herein only for the front brake circuit 1a. For the rear brake circuit 1b, the components same as those in the front brake circuit 1a are denoted by the same reference numerals, and redundant description will be omitted.

As shown in FIG. 1, in each of the respective brake circuits 1a and 1b, a master cylinder 3, provided to be coupled with the brake actuator 2, and a brake caliper 4 are connected through a main brake passage 5. A hydraulic pressure modulator 6 is medially connected to the main brake passage 5. The hydraulic pressure modulator 6 is operable to generate hydraulic pressure, using an electrically-operated actuator (to be described later). A first electromagnetic on-off valve 7 is also provided in each of the respective brake circuits 1a and 1b, at a position closer to the master cylinder 3 than to the part connecting the hydraulic pressure modulator 6 with the main brake passage 5. The first electromagnetic on-off valve is normally open, which allows communication between the master cylinder 3 and the brake caliper 4, as well as interruption of the communication. The system hereof also includes second and third electromagnetic on-off valves, as will be further described herein.

A reaction force modulator 45 is connected to the first electromagnetic on-off valve 7 for each of the respective brake circuits 1a and 1b. The reaction force modulator 45 applies a pseudo-hydraulic force, as needed, to the master cylinder 3 when the electromagnetic on-off valve 7 closes the main brake passage 5, in response to a braking pressure applied to the brake actuator 2.

The brake system according to the embodiment of FIG. 1 also includes an electronic control unit (ECU) or controller 9 for controlling and coordinating operation of the system. The electrically-operated actuator of the hydraulic pressure modulator 6 and the first electromagnetic on-off valve 7 are electrically controlled by use of controller 9 along with valves and the like incorporated in the hydraulic pressure modulator 6 and other parts of the system.

Additionally, the following components are connected to the controller 9: pressure sensors 10, 11 for detecting hydraulic pressures at a position close to an input side (at a position close to the master cylinder 3 across the first electromagnetic on-off valve 7) and at a position close to an output side (at a position close to the brake caliper 4 across the first electromagnetic on-off valve 7) in each of the brake circuits 1a and 1b; a wheel speed sensor 12 for detecting the speed of each of the front and rear wheels; a mode switch 13 for enabling a rider to manually change a control mode; and the like. The controller 9 also controls a braking pressure at the brake caliper 4, in response to input signals or signals for the mode change to be generated in the above operations.

This braking device includes a CBS capable of operating the brake caliper 4 on one of the front wheel and the rear wheel in conjunction with an operation of the brake operating unit 2 on the other of the front wheel and the rear wheel. The brake caliper 4 to be a subordinate to this CBS is operated by a pressure supplied from the hydraulic modulator 6 by use of by-wire method. Specifically, when one of the brake operating units 2 is operated, information such as speeds of the front and rear wheels and a brake manipulated variable (for example, the hydraulic pressure on the input side of the brake circuit) is inputted to the controller 9 through various sensors. In this event, the first electromagnetic opening and closing valve 7 of the other brake circuit closes the main brake passage 5 according to an instruction from the controller 9. At the same time, the hydraulic modulator 6 supplies a hydraulic pressure according to driving conditions of the vehicle and braking operations to the brake caliper 4 of the other circuit. However, supplying of the hydraulic pressure from the hydraulic modulator 6 to the circuit in which no braking operation is performed as described above is limited to when the mode selection switch 13 is set to a mode allowing the CBS, which is described later in detail.

Meanwhile, in the brake circuit in which the brake operating unit 2 is operated first, a hydraulic pressure generated in the master cylinder 3 is supplied directly to the brake caliper 4. Specifically, when the controller 9 determines through the pressure sensor 10 that one of the brake operating units 2 is operated before the other brake operating unit 2, the first electromagnetic opening and closing valve 7 is maintained as it is (normally open) in a non-energized state. As a result, the hydraulic pressure from the master cylinder 3 comes to be supplied to the brake caliper 4 through the main brake passage 5.

Therefore, the CBS of the braking device performs hydraulic control of the brake circuit to be a subordinate by by-wire. Thus, front and rear brakes can be operated in conjunction with each other at an optimum hydraulic ratio without complicating the brake caliper 4 and piping. Moreover, in the brake circuit in which the braking operation is performed first (for example, the master circuit), the hydraulic pressure from the master cylinder 3 is supplied directly to the brake caliper 4. Thus, the hydraulic modulator 6, which is a built-in electric actuator, of the brake circuit can be set in a stopped state. Accordingly, in the braking device, at least one of the hydraulic modulators 6 can be set in an inactive state at the time of braking by the CBS. Consequently, current consumption is surely suppressed.

Moreover, since the first electromagnetic opening and closing valve 7 provided in the main brake passage 5 is normally open, the valve 7 can be set in the non-energized state during normal driving of the vehicle, and the like. Therefore, also in this regard, the current consumption of the vehicle can be significantly suppressed. Note that the above description is given of the case where the braking operation is performed for a relatively short period of time. However, the braking device shifts to a mode of further suppressing the current consumption when the braking operation is performed for a long period of time, such as stopping on a slope. This current suppression mode will be described later.

Now, with reference to FIGS. 2 to 10, the structure and function of the hydraulic modulator 6 will be described.

Figure 3:
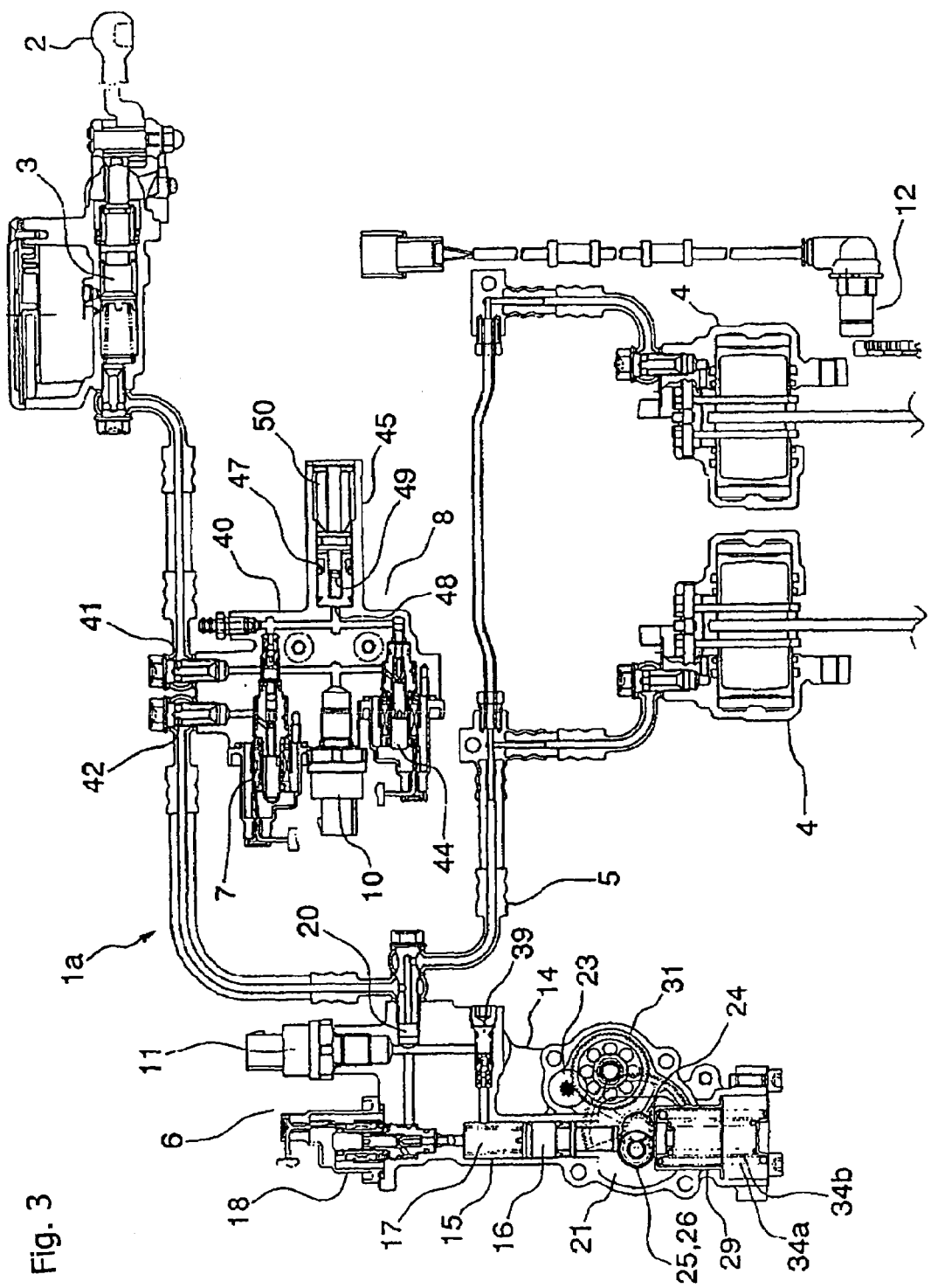
FIG. 3 is a diagram of a braking circuit at a front wheel for the embodiment of FIG. 1 showing hydraulic fluid pathways between braking system components.
Figure 4:
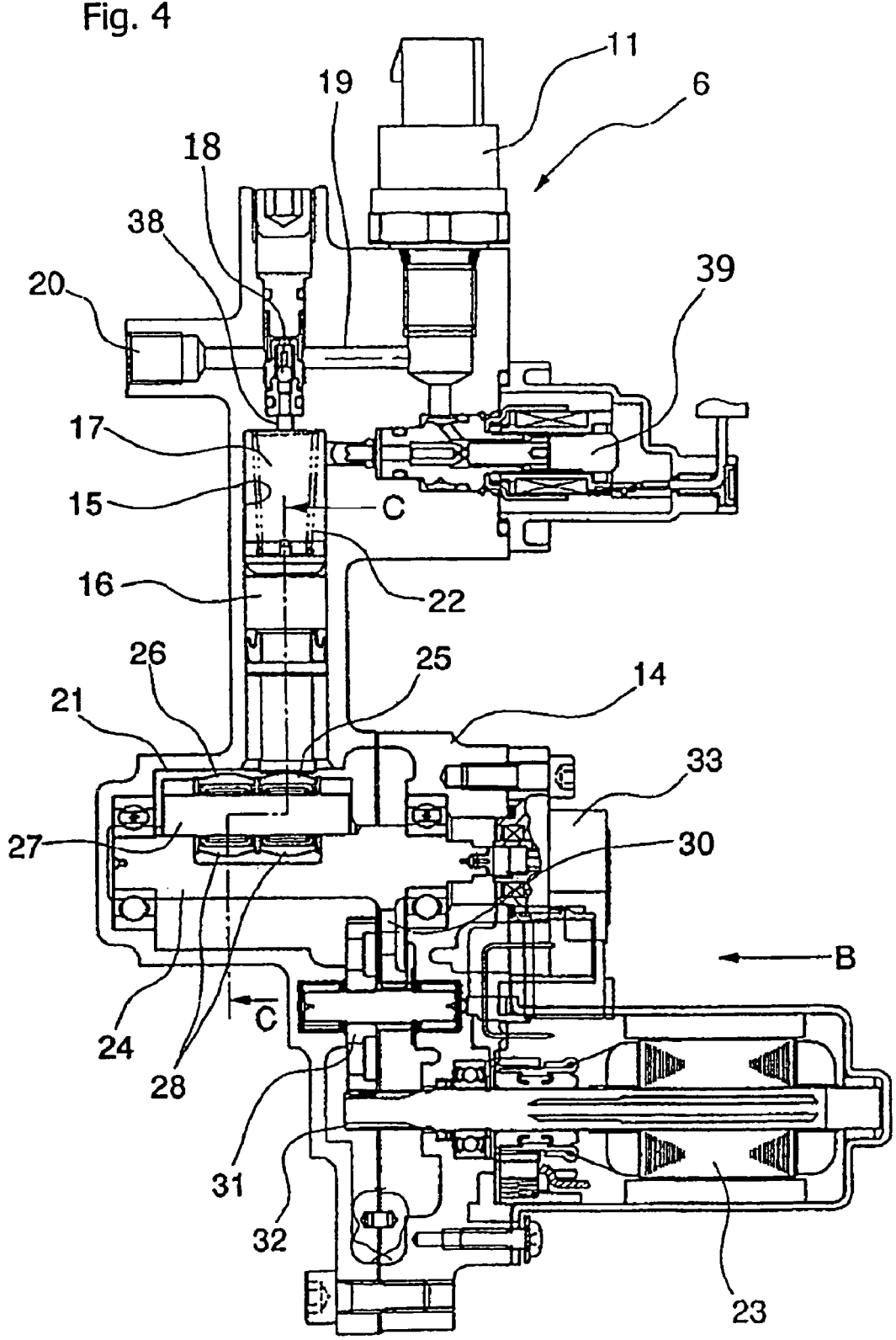
FIG. 4 is an enlarged sectional view of the hydraulic pressure modulator taken along the dashed line A—A in FIG. 5 showing the piston in a neutral position within the hydraulic pressure chamber.
Figure 5:
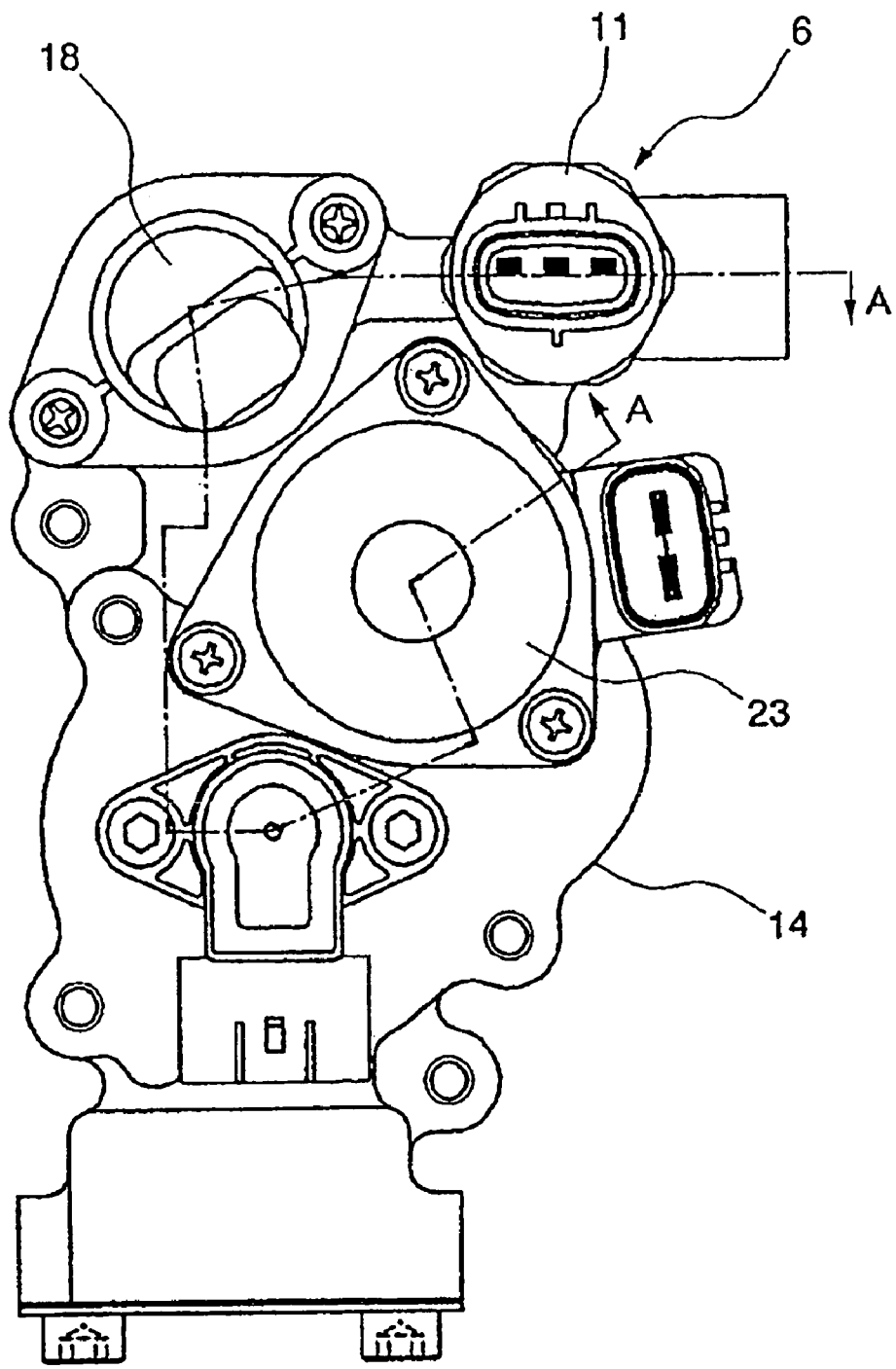
FIG. 5 is a side view of the hydraulic pressure modulator as is seen from the direction of the arrow B in FIG. 4 showing the second electromagnetic on-off valve, the pressure sensor, and the motor lying in parallel.
Figure 9:
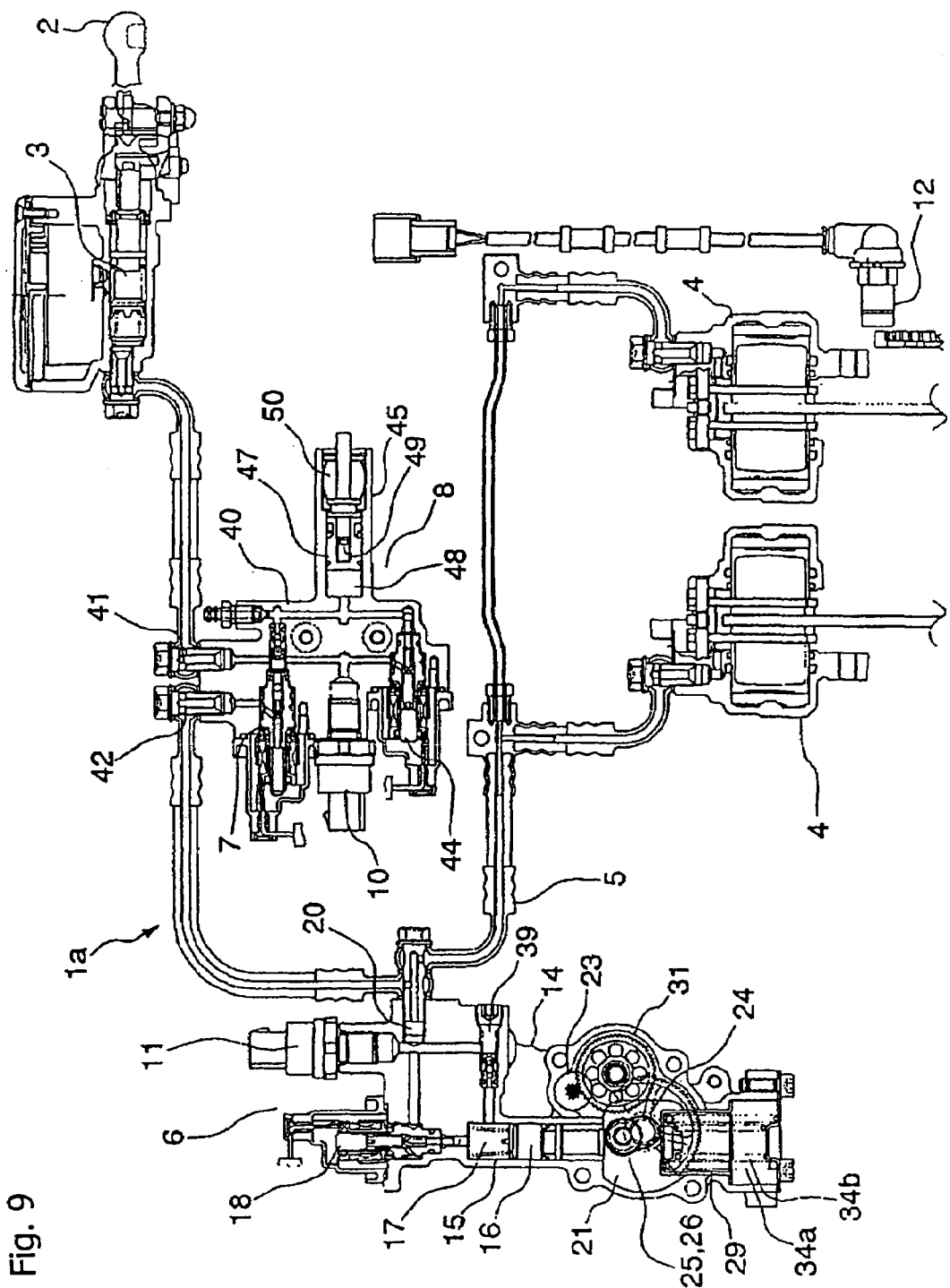
FIG. 9 is a diagram of a braking circuit at a front wheel for the embodiment of FIG. 1 showing hydraulic fluid pathways between braking system components for the braking system in a CBS operation.
Figure 10:
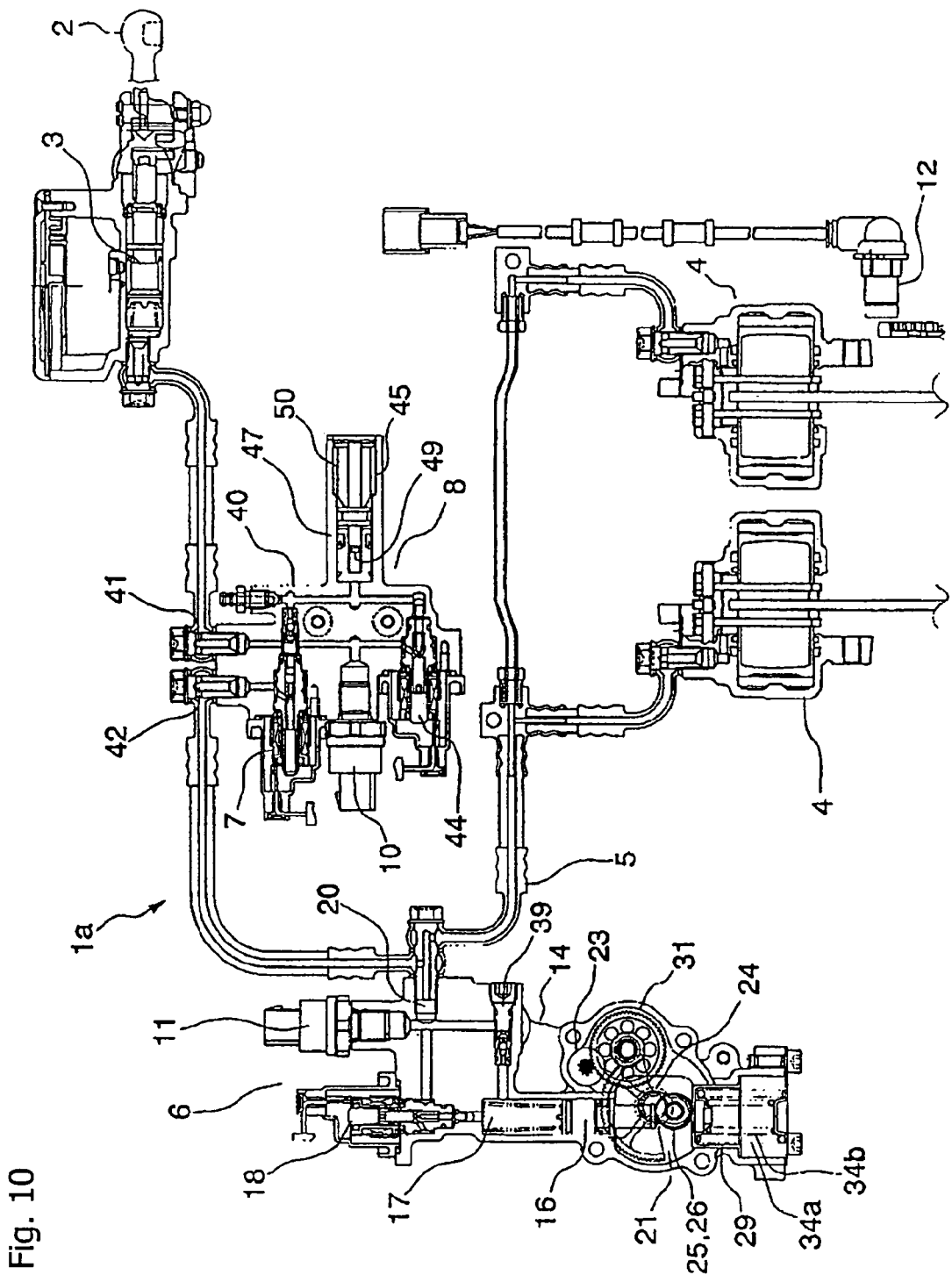
FIG. 10 is a diagram of a braking circuit at a front wheel for the embodiment of FIG. 1 showing hydraulic fluid pathways between braking system components for the braking system in an ABS operation.

As shown in a developed cross-sectional view of FIG. 4, in the hydraulic modulator 6, a piston 16 is housed so as to be movable in a cylinder 15 formed in a modulator body 14, and a hydraulic chamber 17 is formed between the cylinder 15 and the piston 16. This hydraulic chamber 17 is connected to an output port 20 of the modulator body 14 through a main supply and exhaust passage 19 in which a normally closed second electromagnetic opening and closing valve 18 is provided. This output port 20 is connected to the main brake passage 5 as shown in FIGS. 3, 9 and 10. Accordingly, between the hydraulic chamber 17 and the main brake passage 5, a hydraulic fluid is appropriately supplied and discharged. Note that the hydraulic modulator 6 shown in FIG. 4 and the hydraulic modulator 6 shown in FIGS. 3, 9 and 10 are drawn to be different from each other with respect to an internal passage from the hydraulic chamber 17 to the main brake passage 5. However, this is a difference for convenience of graphic representation, and actual structure and function do not vary.

Moreover, the hydraulic modulator 6 includes: a cam mechanism 21 which pushes up the piston 16 in the direction of the hydraulic chamber 17 as shown in FIG. 4; a return spring 22 which constantly presses the piston 16 against the cam mechanism 21 side; and an electric motor 23 as an electric actuator operating the cam mechanism 21. This electric motor 23 is subjected to rotation control accordingly in forward and backward directions by the controller 9 (see FIG. 1).

In the cam mechanism 21, a pair of cam rollers 25 and 26 are provided in a camshaft 24 which is axially supported in the modulator body 14, the rollers being provided so as to be eccentric from a rotation center of the camshaft 24. The both cam rollers 25 and 26 are supported so as to be rotatable, by means of a needle roller bearing 28, on a common shaft 27 provided parallel to the axis of the camshaft 24 in its peripheral portion. Therefore, the both cam rollers 25 and 26 are disposed in the peripheral portion of the camshaft 24 so as to be arranged in series with the axial direction. An end of the piston 16 is urged by the return spring 22 to constantly abut the cam roller 25, and a lifter 29 to be described later abuts the other cam roller 26.

Figure 6:
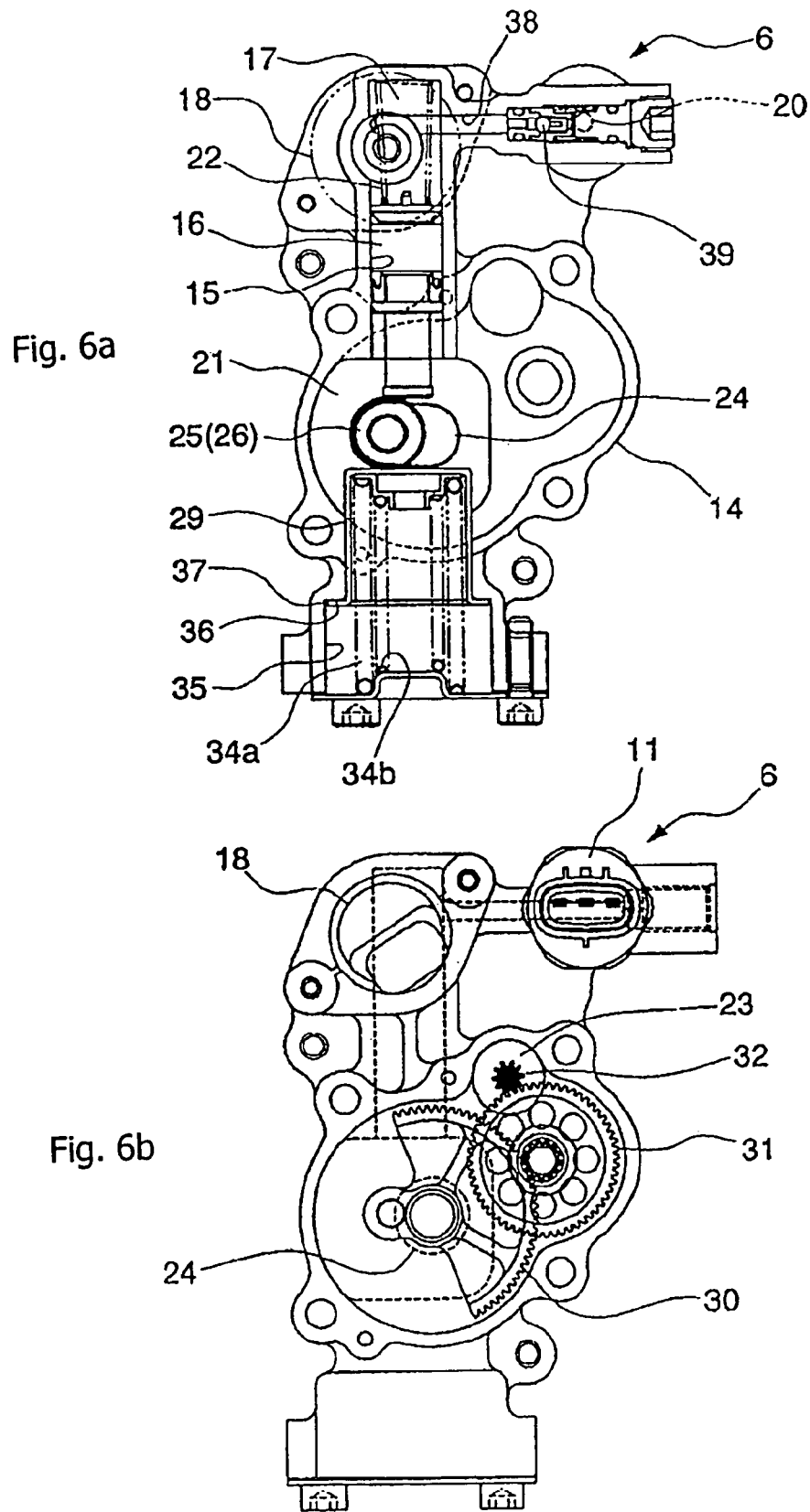
FIG. 6(a) is a sectional view of the hydraulic pressure modulator taken along the dashed line C—C in FIG. 4, which is not in operation, showing the piston in the neutral position.
FIG. 6(b) is a side view of the hydraulic pressure modulator of FIG. 6(a) as seen from the direction of the arrow B in FIG. 4, showing a transmission part of an electrically-operated motor.

Moreover, a sector gear 30 is integrally provided in one end of the camshaft 24, and this sector gear 30 portion is coupled to a pinion gear 32 on an output shaft of the electric motor 23 through a reduction gear 31 (see FIGS. 4 and 6(*b*)). Therefore, running torque of the electric motor 23 is transmitted to the camshaft 24 by engagement of these gears, and rotation of the camshaft 24 by the torque is transmitted, as control force, to the piston 16 through the cam roller 25. Moreover, an angle sensor 33 is further provided in one end of the camshaft 24, and angle information of the camshaft 24, which is detected by the angle sensor 33, is set to be fed back to the controller 9.

The piston 16 is subjected to operation control in one end region and the other end region in the cylinder 15 by using an approximately center position in the cylinder 15 as a neutral reference position. FIGS. 3, 4, 6 (*a*) and 6 (*b*) show a state where the piston 16 is in the neutral reference position. In this state, an eccentric position of the cam roller 25 on the camshaft 24 is approximately orthogonal to a stroke direction of the piston 16. The electric motor 23, by executing energization control, accordingly performs a rotation operation of the eccentric position of the cam roller 25 in a vertical direction in the drawings.

In the hydraulic modulator 6 of this embodiment, a region in which the hydraulic chamber 17 is expanded (for example, the piston moves downward in FIG. 4) with respect to the neutral reference position is set to be used for ABS control, and conversely, a region in which the hydraulic chamber 17 is contracted (for example, the piston moves upward in FIG. 4) is set to be used for CBS control.

The ABS is intended to perform hydraulic control starting from pressure reduction with respect to the main brake passage 5 (the brake caliper 4), to retention and reboosting. Thus, use of the region in which the hydraulic chamber 17 is expanded by operating the piston from the neutral reference position is suitable for the ABS control. Note that FIGS. 8 (*a*), 8 (*b*) and 10 show a state of the ABS control.

Moreover, the CBS is started by actively supplying the hydraulic fluid to the main brake passage (the brake caliper 4). Thus, use of the region in which the hydraulic chamber 17 is contracted by operating the piston upward from the neutral reference position is suitable for the control. Note that FIGS. 7 (*a*), 7 (*b*) and 9 show a state of the CBS control.

Therefore, in the case of this hydraulic modulator 6, the approximately center position of the cylinder 15 is used as the neutral reference position, and the piston 16 is operated by using the ABS and CBS in both regions, respectively. Thus, the necessity to individually provide dedicated pistons for the ABS and the CBS is eliminated. Consequently, a reduction in the number of parts in this hydraulic modulator 6 and reduction in size and weight of the modulator itself are possible.

Figure 7:
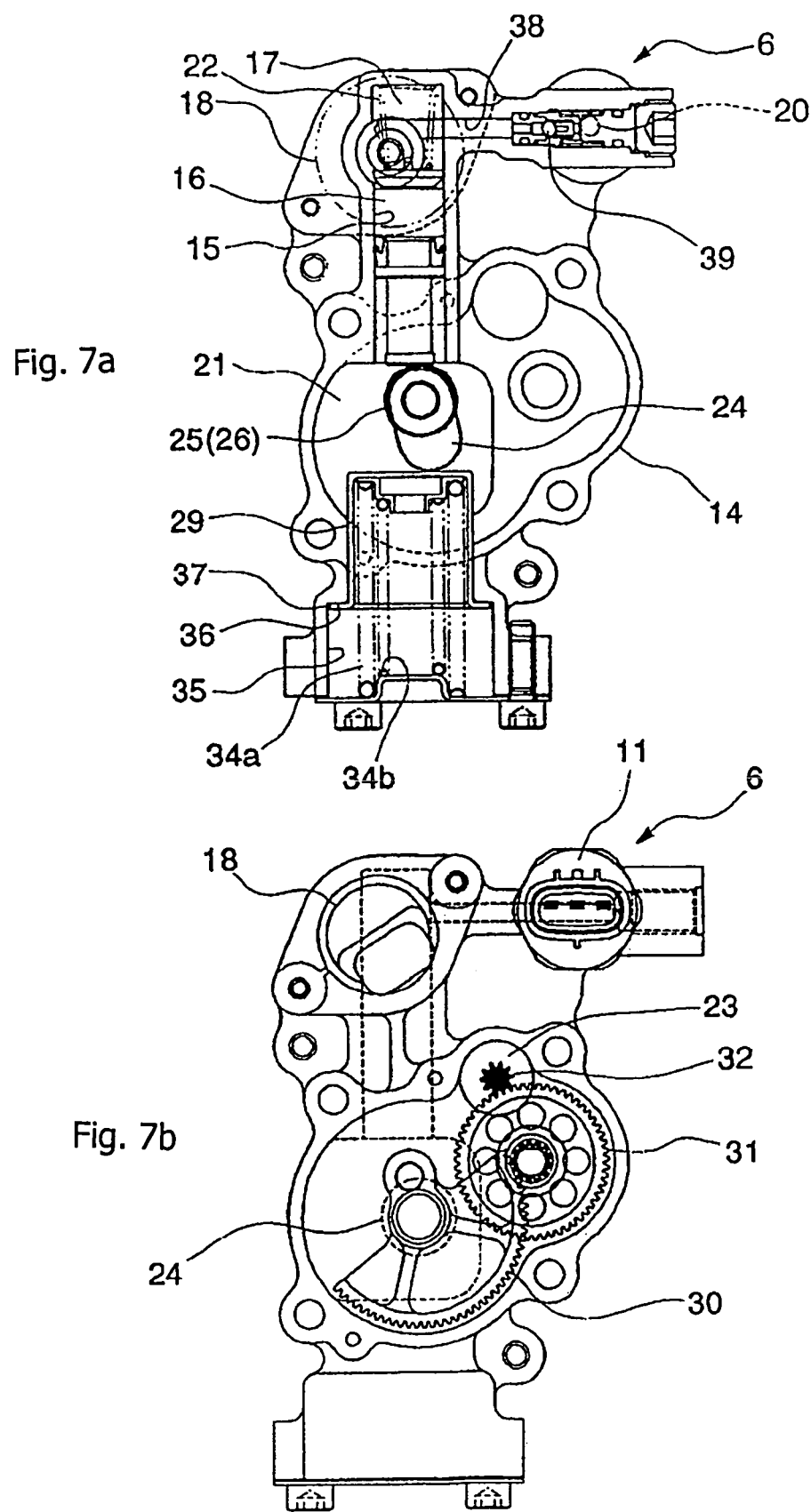
FIG. 7(a) is a sectional view of the hydraulic pressure modulator taken along the dashed line C—C in FIG. 4, showing the hydraulic pressure chamber reduced in sized due to the upward movement of the piston as found when the braking system is under CBS control.
FIG. 7(b) is a side view of the hydraulic pressure modulator of FIG. 7(a) as seen from the direction of the arrow B in FIG. 4, showing a transmission part of an electrically-operated motor.
Figure 8:
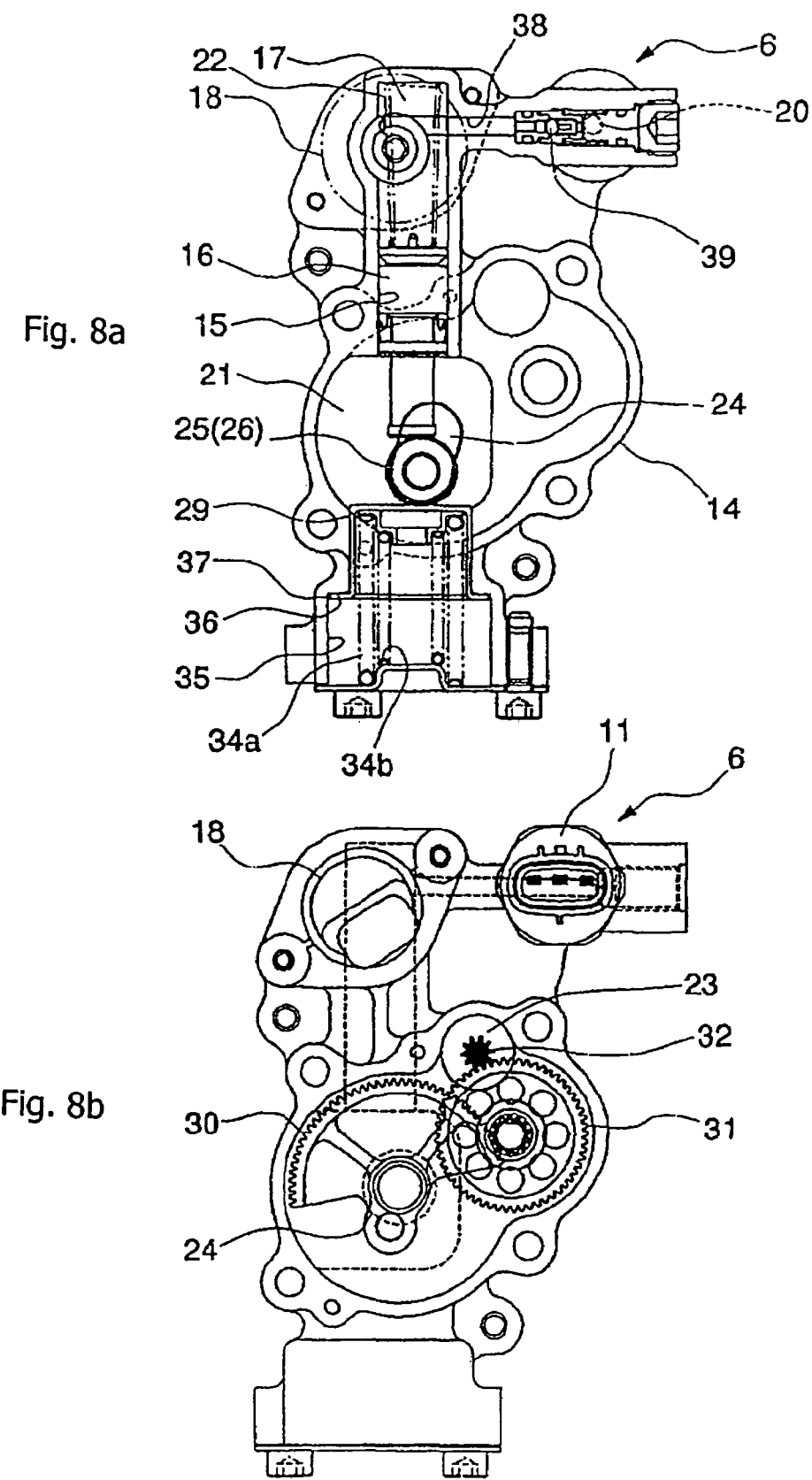
FIG. 8(a) is a sectional view of the hydraulic pressure modulator taken along the dashed line C—C in FIG. 4, showing the hydraulic pressure chamber expanded in sized due to the downward movement of the piston as found when the braking system is under anti-lock brake system (ABS) control.
FIG. 8(b) is a side view of the hydraulic pressure modulator of FIG. 8(a) as seen from the direction of the arrow B in FIG. 4, showing a transmission part of an electrically-operated motor.

Moreover, in the position below the other cam roller 26 of the hydraulic modulator 6, as shown in FIGS. 6 to 8, the above-described cylindrical lifter 29 has a bottom and is disposed so as to be movable. The lifter 29 is urged in the direction of the cam roller 26 by a pair of backup springs 34*a* and 34*b* (energizing means) which are disposed to have a nested structure. The lifter 29 is disposed in a step-like holding hole 35 in the modulator body 14. A stopper flange 37 is integrally formed on an opening rim of the lifter 29. Stopper flange 37 can abut on a step surface 36 of the holding hole 35. This stopper flange 37, together with the step surface of the holding hole 35, forms a stopper which controls an energized position of the piston 16 as urged by the backup springs 34*a* and 34*b*. This stopper (the stopper flange 37 and the step surface 36) controls a maximum energizing position of the piston 16 by the backup springs 34*a* and 34*b* to be set to the aforementioned neutral reference position.

The backup springs 34*a* and 34*b* urge the piston 16 in a direction of contracting the hydraulic chamber 17. This energizing force to the piston 16 is mainly exerted when the electric motor 23 comes to be in a non-energized state. In a situation where there is no action of the torque of the electric motor 23, the position of the piston is returned to the neutral reference position where the above-described stopper operates. Note that the relative spring reaction force of the backup springs 34*a* and 34*b* and the return spring 22 is set to be larger on the side of the backup springs 34*a* and 34*b* when the piston 16 is in the neutral reference position. Spring reaction force in a direction of returning the position of the piston to the neutral reference position is set to act on the piston 16 constantly from the springs 34*a*, 34*b* and 22 on the both sides.

Moreover, as shown in FIG. 4, in the modulator body 14, a bypass passage 38 is provided, which connects the hydraulic chamber 17 to the output port 20 while bypassing the second electromagnetic opening and closing valve 18. In this bypass passage 38, a check valve 39 is provided, which allows the hydraulic fluid to flow in the direction from the hydraulic chamber 17 to the output port 20.

The second electromagnetic opening and closing valve 18 in the main supply and exhaust passage 19 is normally closed type, and is opened by energization only when the ABS control is performed and when the hydraulic fluid is supplied to the brake caliper 4 from the hydraulic modulator 6 by the CBS control. However, even under such control situations, once the second electromagnetic opening and closing valve 18 is set to a non-energized state due to some reason, the supply and exhaust passage 19 is automatically closed. In this braking device, even in such a situation where the second electromagnetic opening and closing valve 18 is closed, the flow of the hydraulic fluid in the direction from the hydraulic chamber 17 to the main brake passage 5 is secured by the bypass passage 38 and the check valve 39.

Moreover, in the case of this braking device, the pressure sensor 11, which detects the hydraulic pressure on the output side of each brake circuit, is assembled in the modulator body 14 of the hydraulic modulator 6. A sensor detection unit is disposed so as to face an upstream position (the output port 20 side position) of the second electromagnetic opening and closing valve 18 on the supply and exhaust passage 19 in the modulator body 14. Therefore, in this braking device, compact arrangement of the pressure sensor 11 and the hydraulic modulator 6 as an integral block can be achieved, and the hydraulic pressure on the output side of the brake circuit can be detected in a region adjacent to the brake caliper 4.

Moreover, in the case of the hydraulic modulator of this embodiment, as shown in FIGS. 5 to 8, the pressure sensor 11, the electric motor 23, and the second electromagnetic opening and closing valve 18, which are functional parts having long axes, are assembled in the modulator body 14 so as to be parallel to each other. Thus, the entire hydraulic modulator 6 is made compact, which is very advantageous in mounting the modulator on the vehicle.

Figure 11:
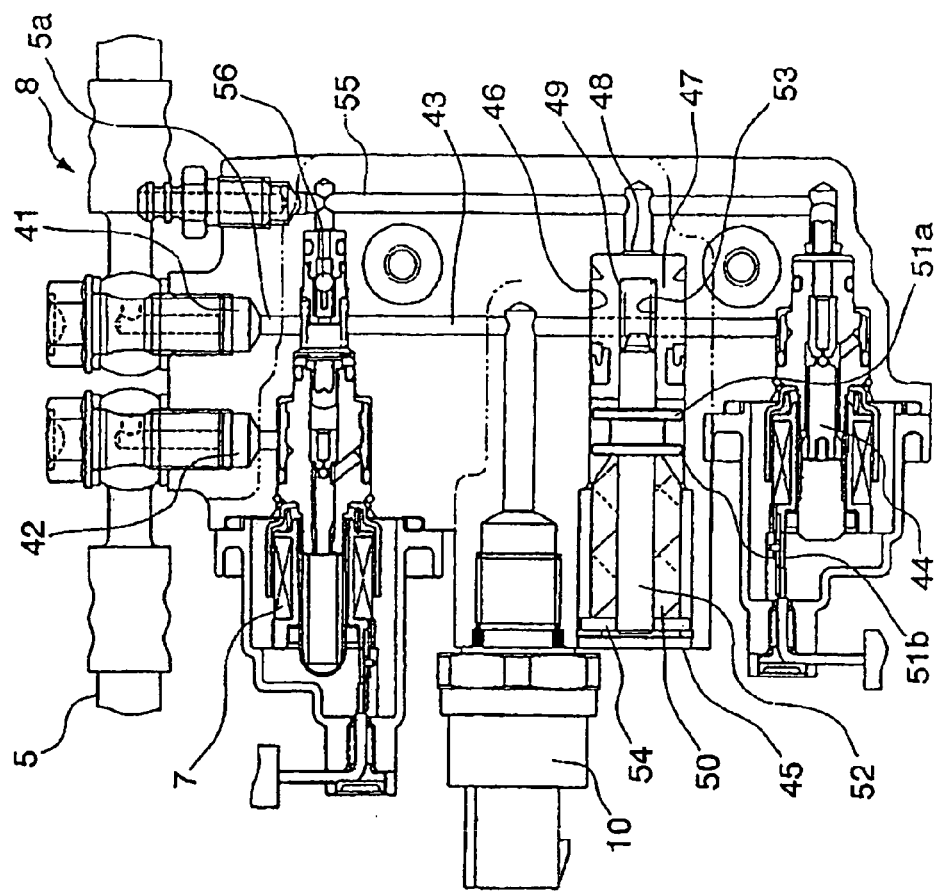
FIG. 11 is a sectional view of a reaction force modulator of the embodiment of FIG. 1.
Figure 12:
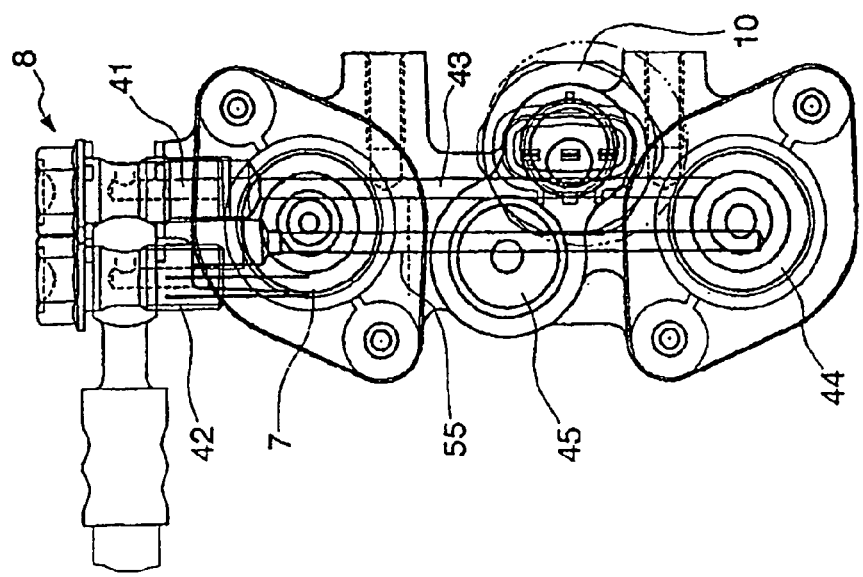
FIG. 12 is a passage arrangement view for the reaction force modulator of FIG. 11 as seen from the direction perpendicular to the section in FIG. 11.

Next, with reference to FIGS. 11 and 12, the specific structure of the reaction force modulator 45 portion will be described. Note that, in the structure shown in FIGS. 11 and 12, directions of constituent components and the like are different from those shown in FIGS. 3, 9 and 10. This is for convenience of graphic representation.

The reaction force modulator 45 is fitted in a passage switching unit 8 having a shape of an integral block. In a unit body 40 of this passage switching unit 8, a main brake forming path 5a, which constitutes part of the main brake passage 5, is formed. One end of this main brake forming path 5a is used as an inlet port 41 which communicates with the master cylinder 3 side. The other end of this main brake forming path 5a is used as an outlet port 42 which communicates with the brake caliper 4 side. Moreover, the aforementioned first electromagnetic opening and closing valve 7 is integrally assembled in the unit body 40, and an open/close operating unit of the first electromagnetic opening and closing valve 7 is set to open and close the main brake forming path 5a.

In an upstream position of the first electromagnetic opening and closing valve 7 (the master cylinder 3 side position) in the main brake forming path 5a, a branch passage 43 is provided. The reaction force modulator 45 is connected to this branch passage 43 through a normally closed third electromagnetic opening and closing valve 44. The third electromagnetic opening and closing valve 44 is subjected to the energization control by the controller 9, as in the case of the first electromagnetic opening and closing valve 7. When the CBS control is performed, the third electromagnetic opening and closing valve 44 allows the master cylinder 3 side and the reaction force modulator 45 to communicate with each other in the brake circuit to be the subordinate side. Note that, in this event, the first electromagnetic opening and closing valve 7 closes the main brake forming path 5a by energization.

Moreover, on an upstream of the third electromagnetic opening and closing valve 44 (the inlet port 41 side) in the branch passage 43, the pressure sensor 10 is provided on the input side of the brake circuit. This pressure sensor 10 is integrally assembled in the unit body 40, and is disposed so as to allow its pressure detection portion to face inside of the branch passage. The upstream portion of the third electromagnetic opening and closing valve 44 in the branch passage 43 is constantly connected to the inlet port 41 regardless of opening and closing of the first electromagnetic opening and closing valve 7. Thus, the pressure sensor 10 can constantly and accurately detect a pressure in the vicinity of the master cylinder 3 in the circuit.

Meanwhile, in the reaction force modulator 45, a piston 47 is housed so as to be movable in a cylinder 46 formed in the unit body 40. Between the cylinder 46 and the piston 47, a fluid chamber 48 is formed, which receives the hydraulic fluid directed in from the master cylinder 3 side. On a back side of the piston 47, a metal coil spring 49 and an irregular-shaped resin spring 50 are arranged in series. By use of the two springs 49 and 50 (elastic members) which have different properties, reaction force is set to be applied to the piston 47.

Moreover, on the back side of the piston 47 in the cylinder 46, a guide rod 52 is diposed. The guide rod 52 has a pair of flanges 51a and 51b formed thereon which are positioned approximately in the center of rod in the axial direction. One end of this guide rod 52 is inserted into a holding hole 53 formed in the center of the back of the piston 47, and the other end thereof penetrates a center portion of the axis of the irregular-shaped resin spring 50. The coil spring 49 is disposed between the holding hole 53 of the piston 47 and the one end of the guide rod 52. The coil spring 49 is generates a spring reaction force by a stroke until the back of the piston 47 abuts on the flange 51a of the guide rod 52. Meanwhile, the irregular-shaped resin spring 50 is disposed between a thrust washer 54 disposed on a bottom of the cylinder 46 and the other flange 51b of the guide rod 52. The irregular-shaped resin spring 50 is set to change its shape by a backward stroke of the guide rod 52, and, in this event, to generate reaction force and damping resistance (internal frictional resistance) caused by the change in shape. Note that the shape and material of the irregular-shaped resin spring 50 are determined according to target characteristics.

Here, with respect to relative spring constants of the coil spring 49 and the irregular-shaped resin spring 50, on the whole, a larger spring constant is set for the irregular-shaped resin spring 50. Accordingly, when the piston 16 performs the backward stroke, the coil spring 49 starts to deform first. Moreover, the coil spring 49, made of metal material, has linear spring characteristics, and the irregular-shaped resin spring 50 has hysteresis characteristics (damping characteristics). Thus, in this reaction force modulator 45, in an early stage of backward movement of the piston 16, reaction force characteristics by the coil spring 49 are mainly obtained having a slow rise. On the other hand, in a later stage of the backward movement, characteristics are obtained by the irregular-shaped resin spring 50 having a sudden rise of reaction force and damping characteristics.

In the case of this braking device, when the CBS control is performed, the hydraulic fluid is introduced into the reaction force modulator 45 from the master cylinder 3 in the brake circuit which is operated with a delay. In this event, multistage reaction forces are generated by the two kinds of springs 49 and 50 as described above in the reaction force modulator 45. Thus, despite its extremely simple structure, the braking device can obtain a feeling of a smooth braking operation which is the same as that obtained by a braking device of a direct operation type.

Moreover, a bypass passage 55 is provided in the unit body 40 of the reaction force modulator 45 which connects the reaction force modulator 45 to the upstream region of the first electromagnetic opening and closing valve 7 in the main brake forming path 5a, while bypassing the third electromagnetic opening and closing valve 44. In this bypass passage 55, a check valve 56 is provided. The check valve 56 allows the hydraulic fluid to flow in the direction from the reaction force modulator 45 side to the inlet port 41 side (in the direction of the master cylinder 3). Therefore, even if the CBS control is released in the state where the hydraulic fluid is introduced into the reaction force modulator 45, the hydraulic fluid in the reaction force modulator 45 is surely returned to the master cylinder 3 side through the bypass passage 55. Thus, since the piston 47 in the reaction force modulator 45 is surely returned to its initial position, the same feeling of braking operation can be obtained when the next CBS control is started.

Moreover, in this embodiment, the first electromagnetic opening and closing valve 7, which opens and closes the main brake passage 5, and the reaction force modulator 45 are integrally assembled in the passage switching unit 8. Thus, the both parts can be made compact as an integral block. Furthermore, in this embodiment, not only the first electromagnetic opening and closing valve 7 but also the pressure sensor 10 on the input side and the third electromagnetic opening and closing valve 44 are integrated in the same unit 8. Thus, density of the functional parts is increased, which is very advantageous in mounting these functional parts on the vehicle.

Furthermore, in the aforementioned passage switching unit 8, the first and third electromagnetic opening and closing valves 7 and 44 and the pressure sensor 10, all of which are functional parts having long axes, are all assembled in the unit body 40 so as to be parallel to the reaction force modulator 45. This is advantageous in making the passage switching unit 8 itself compact.

Moreover, in the passage switching unit 8, the first and third electromagnetic opening and closing valves 7 and 44 are disposed by shifting positions thereof in the axial direction. A passage linking the inlet port 41 to the third electromagnetic opening and closing valve 44 (part of the main brake forming path 5a and part of the branch passage 43) is linearly formed. Thus, there is an advantage of the processing of the passages being facilitated.

Based on the above description of the constituent components, operations of the entire braking device will now be described. Note that in this description, the mode selection switch 13 is considered to be set to a mode allowing the CBS.

In the case where the brake operating unit 2 on one of the front and the rear wheel is operated first by the rider when the vehicle is traveling, in the brake circuit which is operated first, all of the first to second electromagnetic opening and closing valves 7, 44 and 18 remain in a non-energized state, and the hydraulic pressure generated in the master cylinder 3 is directly supplied to the brake caliper 4.

Meanwhile, in this event, in the brake circuit which is operated later, all of the first to second electromagnetic opening and closing valves 7, 44 and 18 are energized, and the main brake passage 5 is cut off from the master cylinder 3 by the first electromagnetic opening and closing valve 7. At the same time, the master cylinder 3 and the reaction force modulator 45 are connected to each other by an opening operation of the third electromagnetic opening and closing valve 44. Furthermore, the hydraulic modulator 6 and the main brake passage 5 are connected to each other by an opening operation of the second electromagnetic opening and closing valve 18. Thus, the rider is provided with a feeling of braking operation which is artificially reproduced by the reaction force modulator 45. At the same time, hydraulic pressure fluctuations due to the operation of the hydraulic modulator 6 are not transmitted to the rider side. Moreover, in this event, the electric motor 23 of the hydraulic modulator 6 is operated in parallel to this event, and the cam roller 25 pushes up the piston 16 to pressurize the hydraulic fluid in the hydraulic chamber 17. Thus, a hydraulic pressure by control of the electric motor 23 is supplied to the brake caliper 4 through the main brake passage 5.

Note that, in this event, the hydraulic pressure supplied to the brake caliper 4 from the hydraulic modulator 6 is controlled so as to offer hydraulic pressures of the front and rear brakes at a previously set distribution ratio. Moreover, in such CBS control, when it is detected that the wheel having the modulator operated is almost locked, the electric motor 23 is controlled by the controller 9 to allow the piston 16 to move backward, and to lower the braking pressure of the brake caliper 4. Thus, locking of the wheel is avoided.

Moreover, when it is detected that the wheel is almost locked in the brake circuit in which the braking operation is performed first, the controller 9 operates the first electromagnetic opening and closing valve 7 to cut off the connection between the master cylinder 3 and the brake caliper 4. At the same time, the controller 9 operates the second electromagnetic opening and closing valve 18 to connect the hydraulic modulator 6 to the main brake passage 5. Moreover, the controller 9 controls the electric motor 23 to allow the piston 16 to move backward from the neutral reference position, and starts the ABS control. Thus, the braking pressure of the brake caliper 4 is reduced, and the locking of the wheel is avoided. Note that, in this event, the third electromagnetic opening and closing valve 44 in the passage switching unit 8 is closed, and the connection between the master cylinder 3 and the reaction force modulator 45 is cut off.

Incidentally, when the ABS control is started as described above, and the piston 16 in the hydraulic modulator 6 moves backward, the backup springs 34a and 34b are compressed through the lifter 29 by eccentric rotation of the cam roller 25 on the camshaft 24. In a normal ABS operation, an operation of lifting the piston 16 from this state is basically performed by the power of the electric motor 23. When the electric motor 23 is set to a non-energized state due to some reasons during the ABS control, the piston 16 is returned to the neutral reference position by the force of the backup springs 34a and 34b, and the hydraulic fluid evacuated in the hydraulic chamber 17 is returned to the main brake passage 5. Moreover, in this event, if the second electromagnetic opening and closing valve 18 is simultaneously set to the non-energized state, the main supply and exhaust passage 19 in the hydraulic modulator 6 is closed. However, in this event, the hydraulic fluid in the hydraulic chamber 17 is returned to the main brake passage 5 through the bypass passage 38 and the check valve 39.

Moreover, when the vehicle is stopped by the series of braking operations, the hydraulic pressure from the master cylinder 3, which is inputted by the rider, acts on one of the wheels, and the hydraulic pressure by the hydraulic modulator 6 acts on the other wheel. After a certain period of time has passed since the vehicle was stopped, the mode is shifted to the aforementioned current suppression mode of stopping the operation of the hydraulic modulator 6 (the electric motor 23).

In this current suppression mode, first, energization of the second electromagnetic opening and closing valve 18 of the hydraulic modulator 6 on the side where the brake caliper 4 is pressurized is stopped. Accordingly, in the state where the connection between the modulator 6 and the main brake passage 5 is cut off, the operation of the electric motor 23 is stopped. In this event, since the hydraulic pressure generated in the hydraulic modulator 6 remains in the main brake passage 5 and the brake caliper 4, the braking force is maintained by the hydraulic pressure.

Next, energization of the first and third electromagnetic opening and closing valves 7 and 44 in the passage switching unit 8 is stopped. Thus, first, the connection between the master cylinder 3 and the reaction force modulator 45 is cut off by closing the third electromagnetic opening and closing valve 44. At the same time, the master cylinder 3 is connected to the brake caliper 4 side of the main brake passage 5 by opening the first electromagnetic opening and closing valve 7. In this event, since the hydraulic pressure generated in the hydraulic modulator 6 remains in the main brake passage 5, the stroke on the master cylinder 3 side is maintained as it is.

By shifting to the current suppression mode in the order as described above, it is possible to switch to braking by the master cylinder 3 without making the rider feel uncomfortable. In addition, even if the operation of the electric motor 23 is stopped as described above, the braking force can be surely maintained. Thus, current consumption by the electric motor 23 can be reduced completely to zero. In addition, abrasion and wear of a motor brush of the electric motor 23, and the like, can be also reduced. Moreover, at the same time, current consumption in the respective electromagnetic opening and closing valves 7, 44 and 18 can be also suppressed.

Moreover, if the rider thereafter releases the braking operation, the hydraulic fluid is returned to the master cylinder 3 from the brake caliper 4 side. At the same time, the hydraulic fluid left in the reaction force modulator 45 is returned to the master cylinder 3 through the bypass passage 55 and the check valve 56. Thereafter, the controller 9 allows the piston 16 in the hydraulic modulator 6 to move backward to the neutral reference position by opening the second electromagnetic opening and closing valve 18 when the hydraulic pressure on the input side of the brake circuit becomes the atmospheric pressure, and by operating the electric motor 23 at the same time.

The basic operations of the braking device have been described above. However, conditions to start the CBS control can be also limited by the controller 9 depending on a brake manipulated variable (for example, the hydraulic pressure on the input side of the brake circuit), a vehicle speed, and the like. For example, in a region where the brake manipulated variable is small, braking of the front and rear wheels may be respectively performed only by the hydraulic pressure of the master cylinder 3 without performing the CBS control. The CBS control using the aforementioned hydraulic modulator 6 may be performed only when the brake manipulated variable is increased to some extent or more. Moreover, when the front and rear brakes are operated to a large degree at the same time, the braking of the front and rear wheels is performed only by the hydraulic pressure of the master cylinder 3 without performing the CBS control. Thus, suppression of the current consumption may be achieved.

Moreover, in the case of the braking device of this embodiment, there are prepared a plurality of kinds of control modes by the controller 9. The rider can switch to an arbitrary control mode by operating the mode selection switch 13.

For example, the following control modes are previously prepared.

(1) Sports mode: a control mode of performing the CBS control only when the braking operation of the front wheel is performed, and performing independent braking by use of the pressure of the master cylinder when the braking operation of the rear wheel is performed.

(2) Touring mode: a control mode of performing the CBS control when the braking operation of any of the front and rear wheels is performed.

(3) Conventional mode: a mode of performing independent braking by use of the pressure of the master cylinder when the braking operation of any of the front and rear wheels is performed.

In this braking device, such control modes can be appropriately switched by the rider according to environments in which the vehicle is used, driving conditions, and the like. Thus, the braking device can constantly perform braking which meets a rider's preference for braking operation.

Moreover, the previously prepared control modes may include, other than those described above: a control mode in which front and rear hydraulic distribution depending on the brake manipulated variable is fixed; and a control mode having different conditions to start the CBS control.

Incidentally, in the case of performing CBS control in which the rear wheel side is operated in conjunction with a braking operation on the front wheel side, as shown in FIG. 13 (a), in this braking device, ratios of braking force distribution to the front and rear wheels when front wheel side braking force is increased (when a brake manipulated variable is increased) are different compared to when the front wheel side braking force is reduced (when the brake manipulated variable is reduced).

Specifically, when the front wheel side braking force is increased, hydraulic control is performed so as to gradually increase rear wheel side braking force up to a certain region. Thereafter, the rear wheel side braking force is temporarily maintained constant until the front wheel side braking force reaches a set value. Subsequently, when the front wheel side braking force exceeds the set value, hydraulic control is performed so as to gradually reduce the rear wheel side braking force. In such a situation where the front wheel side braking force is increased, the rear wheel side braking force is controlled as described above. Thus, braking efficiency in an early stage of braking can be improved, and the reduction of rear-wheel load in a later stage of braking can be suppressed.

On the other hand, when the front wheel side braking force is reduced, the hydraulic control is performed so as to maintain the current rear wheel side braking force or to gradually reduce the rear wheel side braking force in response to the reduction in front wheel side braking force, once the front wheel side braking force drops to below the set value (see the arrow in FIG. 13 (a)). In such a situation where the front wheel side braking force is reduced, an increase in a slip ratio of the rear wheel can be prevented by suppressing the gradual increase in the rear wheel side braking force. Moreover, the rider is provided with a feeling of a smooth braking operation.

In the case of this braking device, since the braking force on the rear wheel side is electrically controlled, the foregoing control can be quickly and accurately performed.

Moreover, the device described above is intended to control the rear wheel side braking force to be maintained or reduced when the front wheel side braking force is reduced by the rider. However, the device can also control braking time on the rear wheel side when the front wheel side braking force is reduced by the rider.

Moreover, this braking device determines the reduction of rear-wheel load as described below in the case of performing the CBS control in which the rear wheel side is operated in conjunction with the braking operation on the front wheel side. Thereafter, the braking device controls rear wheel side braking force distribution so as to suppress the reduction of the rear-wheel load.

Specifically, this braking device is set to determine the reduction of rear-wheel load based on a vehicle speed when the front wheel side braking operation is performed, a hydraulic pressure on the front wheel side, and slip ratios of the front and rear wheels. For each vehicle, depending on a wheel base of each vehicle or a position of gravitational center, and based on a relationship between the vehicle speed and the front wheel side braking force, it is possible to predict how much the rear-wheel load of the vehicle is reduced. The reduction of the rear-wheel load can be determined to some extent based on these two elements. However, in this embodiment, in order to leave out a situation where the both wheels similarly slip, a condition that a slip ratio on the front wheel side is not more than a set value $\lambda a$ and a slip ratio on the rear wheel side is not less than another set value $\lambda b$ is added to determination conditions.

Specifically, in this braking device, the reduction of the rear-wheel load is suppressed by processing as shown in FIG. 14, for example.

Specifically, first, in Steps 100 and 101, it is determined whether or not a hydraulic pressure applied to front wheel brake circuit is not less than a set pressure Pa, and a vehicle speed is not less than a set speed va. When the both conditions are satisfied, in Step 102, it is determined whether or not the slip ratio on the front wheel side is not more than $\lambda a$. Subsequently, in Step 103, it is determined whether or not the slip ratio on the rear wheel side is not less than $\lambda b$. When the above four conditions are all satisfied, it is assumed that the reduction of the rear-wheel load is started. Accordingly, in Step 104, the current braking force on the rear wheel side is maintained as it is. Thereafter, in the next Step 105, it is determined again whether or not the slip ratio on the rear wheel side is not less than $\lambda b$. When the slip ratio is determined to be smaller than $\lambda b$ in Step 105, the processing skips subsequent steps (END). On the other hand, when the slip ratio is determined to be not less than $\lambda b$, it is determined in the next Step 106 whether or not the number of times the loop has been repeated is not less than N. Here, if the number of times the loop has been repeated does not reach N, the processing returns to Step 104 to increase the number of times the loop has been repeated by 1. Meanwhile, when the loop has been repeated N times (in other words, if the slip ratio has not been reduced to below $\lambda b$ even after a predetermined time), a braking pressure on the rear wheel side is reduced in Step 107.

Figure 15:
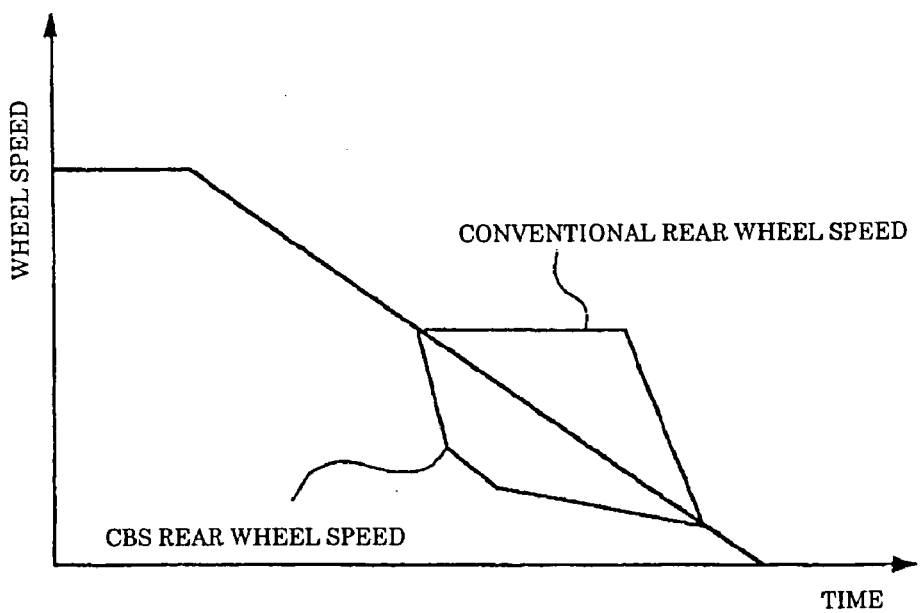
FIG. 15 is a rear wheel speed characteristic view comparing a brake system employing a CBS and that not employing a CBS, when a braking operation for a front wheel is performed.

Therefore, in the case of this braking device, additional reduction of the rear-wheel load when the braking operation on the front wheel side is performed can be prevented by the control as described above. Note that, in FIG. 15, changes in a wheel speed of the rear wheel at the time of the front wheel braking operation are compared between the case of independent braking on the front wheel side and the case of the CBS control. In the case of existing rear-wheel load detection means employed in a braking device having no CBS, a point where the deceleration gradient of a rear wheel speed becomes small is determined as the reduction of the rear-wheel load. Meanwhile, in the case of the braking device employing the CBS, since the deceleration gradient does not become small even if the rear-wheel load is reduced, the existing technology cannot be directly applied thereto. However, the braking device of this embodiment can accurately determine the reduction of the rear-wheel load as described above.

Moreover, in the case of performing the CBS control in which the front wheel side is operated in conjunction with the braking operation executed on the rear wheel side, this braking device controls front wheel side braking force distribution as described below.

Figure 16:
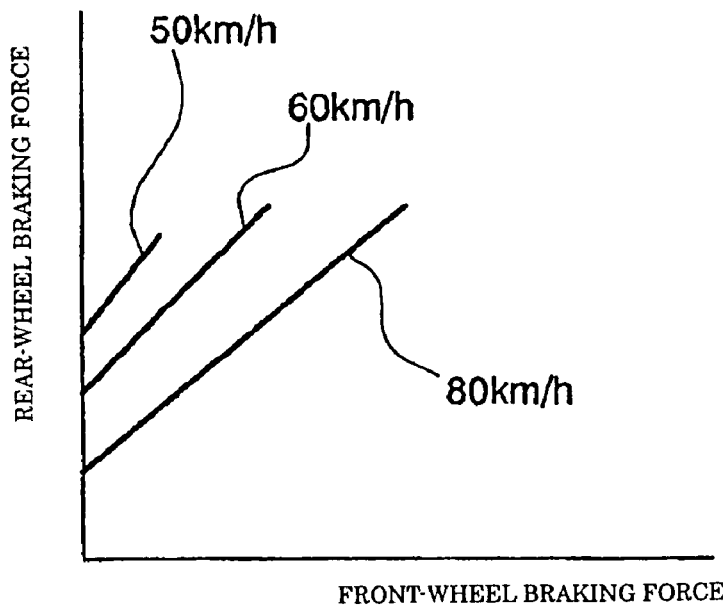
FIG. 16 is a braking force characteristic view for the front and rear wheels when a braking operation for a rear wheel is performed in the embodiment of FIG. 1.

Specifically, as shown in FIG. 16, distribution characteristics of front wheel braking force with respect to rear wheel braking force are previously determined for each vehicle speed. When a braking operation on the rear wheel side is started, the front wheel braking force is set to be consistently controlled by use of distribution characteristics that correspond to a speed when the braking operation is started. Thus, if a brake manipulated variable (for example, the hydraulic pressure on the input side of the brake circuit) on the rear wheel side is constant, braking force of a constant distribution ratio is to act on the front wheel side until the vehicle is stopped. As to the braking force distribution characteristics previously set for each vehicle speed, it is preferable that, for example, when the vehicle speed is 50 km/h, the front wheel braking force is maintained at zero until rear wheel braking force (hydraulic pressure) reaches a certain value. Thereafter, the front wheel braking force is increased according to an increase in the rear wheel braking force when the rear wheel braking force exceeds the value. A starting point of the distribution of front wheel braking force and a distribution ratio of the front wheel braking force are preferably to increase, respectively, as the vehicle speed increases to 60 km/h and to 80 km/h. Moreover, in this case, when the vehicle speed is lower than a certain speed (for example, 50 km/h), there is no braking force distribution to the front wheel.

Figure 17:
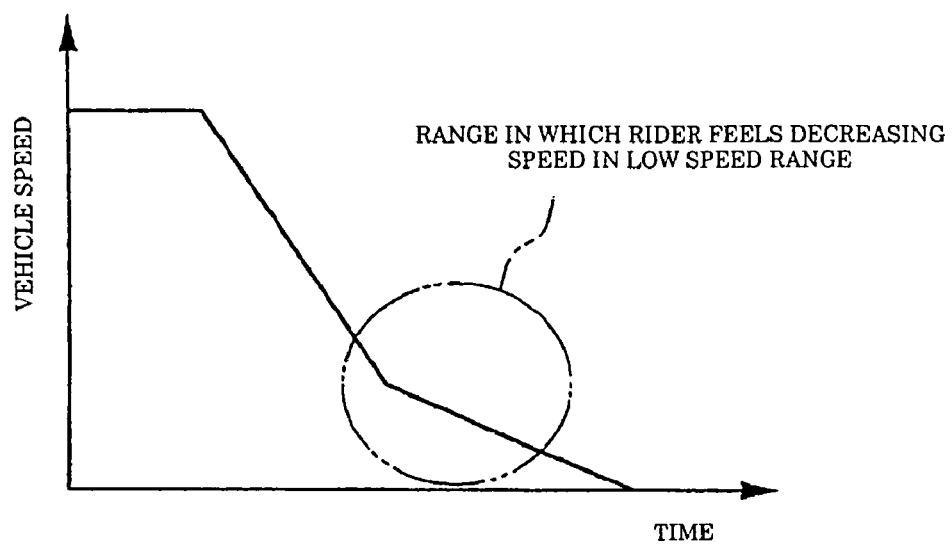
FIG. 17 is a vehicle speed decrement characteristic view when a braking operation for a rear wheel is performed in a prior art braking system, for a comparative example.

In the case of this braking device, in the CBS control of the rear wheel side braking operation, the front wheel side braking force is consistently controlled by use of the braking force distribution characteristics corresponding to the vehicle speed when the braking operation is started. Thus, even if the rear wheel side braking operation is performed from a high-speed driving state, as shown in FIG. 17, the deceleration gradient does not drastically change in the middle. Therefore, the rider does not feel uncomfortable during the braking operation.

Moreover, in this braking device, when the braking operation is performed during the high-speed driving, the front wheel side braking force distribution is increased. Thus, the braking efficiency is improved. On the contrary, when a braking operation is performed during low-speed driving, the front wheel side braking force distribution is reduced (including the case of zero). Thus, the front wheel braking force never affects driving at the time of passing through between vehicles, and the like.

Note that the braking force distribution characteristics previously set for each vehicle speed are not limited to those shown in FIG. 16, but are arbitrary. For example, the braking force distribution characteristics may be set in such a manner that the front wheel side braking force distribution is rapidly increased when a brake manipulated variable (braking force) on the rear wheel side exceeds a certain value at each speed. In this case, a quicker braking effect can be obtained at the time of a braking operation requiring a sudden stop, and the like.

While a working example of the present invention has been described above, the present invention is not limited to the working example described above, but various design alterations may be carried out without departing from the present invention as set forth in the claims.

What is claimed is:

1. A braking device for a motorcycle having a front wheel and a rear wheel, the braking device comprising:
    a front wheel braking mechanism operatively attached to said front wheel;
    a rear wheel braking mechanism operatively attached to said rear wheel;

a vehicle speed sensor;
a fluid pressure sensor operatively associated with the front wheel braking mechanism;
a controller which is operable to control the rear wheel braking mechanism;
an electric actuator which produces hydraulic pressure;
a hydraulic modulator which regulates the hydraulic pressure applied to the rear wheel braking mechanism;
a main brake passage having the hydraulic modulator operatively connected therewith at a middle portion thereof;
a master cylinder and a caliper operatively connected to the main brake passage at respective end portions thereof; and
an electromagnetic valve disposed in the main brake passage between the master cylinder and the caliper;
wherein
the controller is configured and adapted to automatically coordinate operation of the rear wheel braking mechanism with a manual front wheel braking operation, and the controller is operable to determine whether rear-wheel load is decreasing during the front wheel braking operation based on:
vehicle speed signals received from the vehicle speed sensor during the front wheel braking operation, and hydraulic pressure signals received from said fluid pressure sensor and corresponding to a hydraulic pressure applied to the front wheel braking mechanism;
wherein a reduction of the rear-wheel load is determined by the controller when a vehicle speed is greater than or equal to a pre-determined speed and a hydraulic pressure of the front wheel braking mechanism is greater than or equal to a pre-determined pressure;
wherein, when the reduction of the rear-wheel load is determined, the controller is operable to control the rear wheel braking mechanism to suppress the reduction of the rear-wheel load;
wherein when the reduction of the rear-wheel load is determined, the controller electrically controls the hydraulic modulator to control application of the hydraulic pressure to the rear wheel braking mechanism; and
wherein the electromagnetic valve is closed when the hydraulic modulator is set to an on position.

2. A braking device for a motorcycle, the braking device comprising:
a front wheel braking mechanism;
a rear wheel braking mechanism;
a vehicle speed sensor;
a fluid pressure sensor operatively associated with the front wheel braking mechanism;
a controller which is operable to control the rear wheel braking mechanism;
an electric actuator which produces hydraulic pressure;
a hydraulic modulator which regulates hydraulic pressure applied to the rear wheel braking mechanism,
a main brake passage having the hydraulic modulator operatively connected therewith at a middle portion thereof;
a master cylinder and a caliper operatively connected to the main brake passage at respective end portions thereof; and
an electromagnetic valve disposed in the main brake passage between the master cylinder and the caliper;
wherein
the controller is configured and adapted to coordinate operation of the rear wheel braking mechanism with a front wheel braking operation, and the controller is able to determine whether rear-wheel load is decreasing during the front wheel braking operation based on:
vehicle speed signals received from the vehicle speed sensor during the front wheel braking operation; hydraulic pressure signals received from said fluid pressure sensor and corresponding to a hydraulic pressure applied to the front wheel braking mechanism; and
respective slip ratios of the front and rear wheels;
wherein a reduction of the rear-wheel load is determined by the controller when a vehicle speed is greater than or equal to a pre-determined speed and a hydraulic pressure of the front wheel braking mechanism is greater than or equal to a pre-determined pressure;
wherein when the reduction of the rear-wheel load is determined, the controller is operable to control hydraulic pressure applied to the rear wheel braking mechanism in a manner so as to keep the slip ratio of the rear wheel at or below a set value;
wherein when the reduction of the rear-wheel load is determined, the controller electrically controls the hydraulic modulator so as to regulate the hydraulic pressure applied to the rear wheel braking mechanism; and
wherein the electromagnetic valve is closed when the hydraulic modulator is set to an on position.

3. The braking device for a motorcycle according to claim 2, wherein
when determining whether rear-wheel load is reduced, the controller evaluates a slip ratio of the front wheel to check whether the slip ratio on the front wheel is less than or equal to a first set value, and if so, the controller then evaluates a slip ratio of the rear wheel to check whether the slip ratio of the rear wheel side is greater than or equal to a second set value.

4. The braking device for a motorcycle according to claim 2, wherein
when determining if the rear-wheel load is reduced,
the controller first evaluates whether the hydraulic pressure applied to the front wheel brake is greater than or equal to the predetermined pressure;
the controller then evaluates whether the vehicle speed is greater than or equal to the predetermined speed;
the controller then evaluates whether the slip ratio on the front wheel is less than or equal to a first set value, and then
the controller evaluates whether the slip ratio on the rear wheel is greater than or equal to a second set value;
wherein when the results of the evaluation of the hydraulic pressure applied to the front wheel braking mechanism, the vehicle speed, the slip ratio of the front wheel, and the slip ratio of the rear wheel satisfies the respective evaluation criteria, the controller determines that the rear wheel load is reduced.

5. A brake system for a two-wheeled motor vehicle having a front wheel and a rear wheel, the brake system configured and adapted to coordinate a braking operation for the front wheel with operation of a wheel braking mechanism for the rear wheel, the brake system comprising:
a front wheel braking mechanism for the front wheel;
a rear wheel braking mechanism for the rear wheel;
an electrically-operated motor for generating hydraulic pressure;
a hydraulic pressure modulator for supplying hydraulic pressure generated by the electrically-operated motor to the rear wheel braking mechanism for the rear wheel;

a controller for electrically regulating the supply of hydraulic pressure from the hydraulic pressure modulator to the rear wheel braking mechanism in response to a braking operation;

a main brake passage having the hydraulic modulator operatively connected therewith at a middle portion thereof;

a master cylinder and a caliper operatively connected to the main brake passage at respective end portion thereof; and an electromagnetic valve disposed in the main brake passage between the master cylinder and the caliper;

wherein when the braking operation for the front wheel actuates the rear wheel braking mechanism for the rear wheel, the controller determines whether a rear-wheel load is reduced based on a vehicle speed and a hydraulic pressure of the front wheel braking mechanism;

wherein a reduction of the rear-wheel load is determined when a vehicle speed is greater than or equal to pre-determined speed and a hydraulic pressure of the front wheel braking mechanism is greater than or equal to a pre-determined pressure;

when the reduction of the rear-wheel load is determined, the controller controls the rear wheel braking mechanism to suppress the reduction of the rear-wheel load;

wherein when the reduction of the rear-wheel load is determined, the controller electrically controls the hydraulic modulator so as to regulate the hydraulic pressure applied to the rear wheel braking mechanism; and the electromagnetic valve is closed when the hydraulic modulator is set to an on position.

6. The brake system for a two-wheeled motor vehicle of claim 5, wherein
the controller is operable to compare respective slip ratios of the front and rear wheels as part of determining whether the rear wheel load is reduced.

7. The brake system for a two-wheeled motor vehicle of claim 5, wherein
the controller is operable to suppress reduction of the rear-wheel load by maintaining or reducing the hydraulic pressure applied to the rear wheel braking mechanism.

8. The brake system for a two-wheeled motor vehicle of claim 5, wherein the controller further determines if the rear-wheel load is reduced based on whether
a slip ratio for the front wheel is less than or equal to a pre-determined value; and
a slip ratio for the rear wheel is greater than or equal to a pre-determined value;
wherein when a slip ratio or the front wheel is less than or equal to a pre-determined value, and a slip ratio for the rear wheel is greater than or equal to a pre-determined value, the rear wheel load is determined to be reducing.

9. In a two wheeled motor vehicle having a front wheel and a rear wheel,
the improvement comprising a combined brake system which allows coupling of a braking operation of a front wheel with operation of a wheel braking mechanism for the rear wheel, the combined brake system comprising:
a front wheel braking mechanism for the front wheel, and
a rear wheel braking mechanism for the rear wheel;
an electrically-operated actuator for use in generating hydraulic pressure;

a vehicle speed sensor;

a pair of hydraulic pressure modulators, one of said hydraulic pressure modulators corresponding to and selectively placeable in fluid communication with each of said wheel braking mechanisms for transmitting the hydraulic pressure generated by the electrically-operated actuator to the corresponding wheel braking mechanisms, respectively;

a pair of main brake passages, each of said main brake passages having one of sad hydraulic modulators operatively connected therewith at a middle portion thereof a master cylinder and a caliper connected to each of said main brake passages at end portions thereof;

an electromagnetic valve disposed in the each of said main brake passages between the master cylinder and the caliper;

an electronic controller for regulating a supply of the hydraulic pressure from the hydraulic pressure modulators to the corresponding wheel braking mechanisms in response to a braking operation and a riding condition of the vehicle, the controller being operable to determine whether rear-wheel load is reduced during braking, based on:

a vehicle speed during front wheel braking operation, and
a hydraulic pressure applied to the front wheel braking mechanism;

wherein a reduction of the rear-wheel load is determined by the controller when a vehicle speed is greater than or equal to pre-determined speed and a hydraulic pressure of the front wheel braking mechanism is greater than or equal to a pre-determined pressure;

wherein when the reduction of the rear-wheel load is determined, the controller is adapted to control the rear wheel braking mechanism to suppress the reduction of the rear-wheel load; and wherein the electromagnetic valve is closed when the hydraulic modulator is set to on position.

10. A method of controlling operation of a brake system in a two-wheeled vehicle having a front wheel with a front wheel braking mechanism, a rear wheel with a rear wheel braking mechanism, a fluid pressure sensor operatively associated with the front wheel braking mechanism; a controller which is operable to control the rear wheel braking mechanism; an electric actuator which produces hydraulic pressure; a hydraulic modulator which regulates hydraulic pressure applied to the rear wheel braking mechanism, a main brake passage having the hydraulic modulator operatively connected therewith at a middle portion thereof; a master cylinder and a caliper are connected to the main brake passage; an electromagnetic valve disposed in the main brake passage between the master cylinder and the caliper; wherein said electromagnetic valve is closed when the hydraulic modulator is set to an on position, said method comprising the steps of:

a) monitoring hydraulic pressure at said front wheel braking mechanism using said fluid pressure sensor;
b) monitoring vehicle speed using a vehicle speed sensor; coupling a braking operation of said front wheel with coordinated operation of said rear wheel braking mechanism;
c) generating hydraulic pressure by operating an electrically operated motor;
d) supplying hydraulic pressure generated by the electrically-operated motor to the rear wheel braking mechanism for the rear wheel, using a hydraulic pressure modulator; and e) electrically controlling a flow of hydraulic pressure from the hydraulic pressure modulator to the wheel braking mechanism in response to a braking operation, wherein when the braking operation for the front wheel actuates the rear wheel braking mechanism for the rear wheel, the controller determines if the rear-wheel load is reduced based on a vehicle speed and a hydraulic pressure of front wheel braking mechanism, wherein the reduction of the rear-wheel load is determined when a vehicle speed is greater than or equal to pre-determined speed and a hydraulic pressure of the front wheel braking mechanism is greater than or equal to a pre-determined pressure;

wherein when the reduction of the rear-wheel load is determined, the controller electrically controls the hydraulic modulator so as to regulate the hydraulic pressure applied to the rear wheel braking mechanism; and wherein when the reduction of the rear-wheel load is determined, the controller controls the rear wheel braking mechanism to suppress the reduction of the rear-wheel load.

11. The method of claim 10, wherein the controller determines if the rear wheel load is reduced further based on respective slip ratios of the front and rear wheels.

12. The method of claim 10, wherein the controller suppresses the reduction of the rear-wheel load by one of maintaining or reducing the hydraulic pressure applied to the rear wheel braking mechanism.

13. The method of claim 10, wherein the controller further determines if the rear-wheel load is reduced based on whether
- a slip ratio for the front wheel is less than or equal to a pre-determined value; and
- a slip ratio for the rear wheel is greater than or equal to a pre-determined value;

wherein when a slip ratio for the front wheel is less than or equal to a pre-determined value, and a slip ratio for the rear wheel is greater than or equal to a pre-determined value, the rear wheel load is determined to be reducing.

* * * * *